United States Patent
Im et al.

(10) Patent No.: US 12,442,656 B2
(45) Date of Patent: Oct. 14, 2025

(54) METHOD AND SYSTEM FOR CONTROLLING HEAD UP DISPLAY

(71) Applicant: NAVER LABS CORPORATION, Seongnam-si (KR)

(72) Inventors: Ye Sook Im, Seongnam-si (KR); Jae Won Cha, Seongnam-si (KR); Hak Seung Choi, Seongnam-si (KR); Eun Young Jeong, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 391 days.

(21) Appl. No.: 17/658,376

(22) Filed: Apr. 7, 2022

(65) Prior Publication Data

US 2022/0228881 A1  Jul. 21, 2022

Related U.S. Application Data

(63) Continuation of application No. PCT/KR2020/015453, filed on Nov. 6, 2020.

(30) Foreign Application Priority Data

Oct. 8, 2020 (KR) .................. 10-2020-0129885

(51) Int. Cl.
*G01C 21/36* (2006.01)
*G01C 21/00* (2006.01)
(Continued)

(52) U.S. Cl.
CPC ....... *G01C 21/3694* (2013.01); *G01C 21/365* (2013.01); *G01C 21/3896* (2020.08); *G08G 1/096861* (2013.01); *B60K 35/23* (2024.01)

(58) Field of Classification Search
CPC .............. G01C 21/3694; G01C 21/365; G01C 21/3896; G08G 1/096861; G08G 1/166;
(Continued)

(56) References Cited

U.S. PATENT DOCUMENTS 6,289,278 B1 * 9/2001 Endo .................... G01C 21/367
701/461
2009/0225242 A1 * 9/2009 Sato ..................... G09G 3/3655
349/37
(Continued)

FOREIGN PATENT DOCUMENTS

JP 2002054934 A 2/2002
JP 2019010965 A 1/2019
(Continued)

OTHER PUBLICATIONS

Office action issued in KR application No. 2020-0129885, dated Apr. 27, 2022.
(Continued)

*Primary Examiner* — Ryan W Sherwin
(74) *Attorney, Agent, or Firm* — Greer Burns & Crain Ltd.

(57) ABSTRACT

A method of controlling a head-up display includes sensing occurrence of an event related to a vehicle; updating event information related to the event, to a specific map, in response to the event occurrence; outputting the event information to a preset position in front of the vehicle, by using a head-up display; maintaining the output of the event information at the preset position, even if a relative distance between the vehicle and the preset position is changed based on the driving of the vehicle; and terminating the output of the event information when the vehicle passes through the preset position.

19 Claims, 20 Drawing Sheets

(51) Int. Cl.
*G08G 1/0968* (2006.01)
*B60K 35/23* (2024.01)

(58) Field of Classification Search
CPC .... G08G 1/167; G08G 1/09623; B60K 35/23; B60K 35/00; G02B 27/01; G02B 27/0101; G02B 2027/014; G02B 2027/0141
See application file for complete search history.

(56) References Cited

U.S. PATENT DOCUMENTS

| | | | |
|---|---|---|---|
| 2011/0130951 A1* | 6/2011 | Lee | G01C 21/3878 709/219 |
| 2013/0339891 A1* | 12/2013 | Blumenberg | G06F 16/9537 715/771 |
| 2014/0268353 A1* | 9/2014 | Fujimura | G02B 27/0101 359/630 |
| 2014/0292653 A1* | 10/2014 | Kamba | G02B 27/017 345/157 |
| 2015/0015457 A1* | 1/2015 | Takasu | G09G 3/3406 345/7 |
| 2015/0226568 A1* | 8/2015 | Ann | G01C 21/36 701/400 |
| 2016/0153801 A1* | 6/2016 | Cho | G06T 11/60 701/431 |
| 2019/0143967 A1* | 5/2019 | Kutila | B60W 60/0016 701/23 |
| 2019/0265045 A1* | 8/2019 | Baik | G05D 1/229 |
| 2020/0116518 A1* | 4/2020 | Lee | G06F 3/013 |
| 2020/0245115 A1* | 7/2020 | Dorrance | H04L 41/142 |
| 2021/0370983 A1* | 12/2021 | Oba | G08G 1/166 |

FOREIGN PATENT DOCUMENTS

| | | | |
|---|---|---|---|
| KR | 1020150054022 A | | 5/2015 |
| KR | 1020150094382 A | | 8/2015 |
| KR | 1020160065724 A | | 6/2016 |
| KR | 1020160118014 A | | 10/2016 |
| KR | 1020170004150 A | | 1/2017 |
| KR | 1020200040507 A | | 4/2020 |
| KR | 1020200042166 A | | 4/2020 |

OTHER PUBLICATIONS

ISR issued in PCT/KR2020/015453, dated Jul. 5, 2021.
Office action issued in Korean application No. 10-2020-0129885, dated Oct. 31, 2022.

\* cited by examiner (a)

(b)

(a)

(b)

(a)

(b)

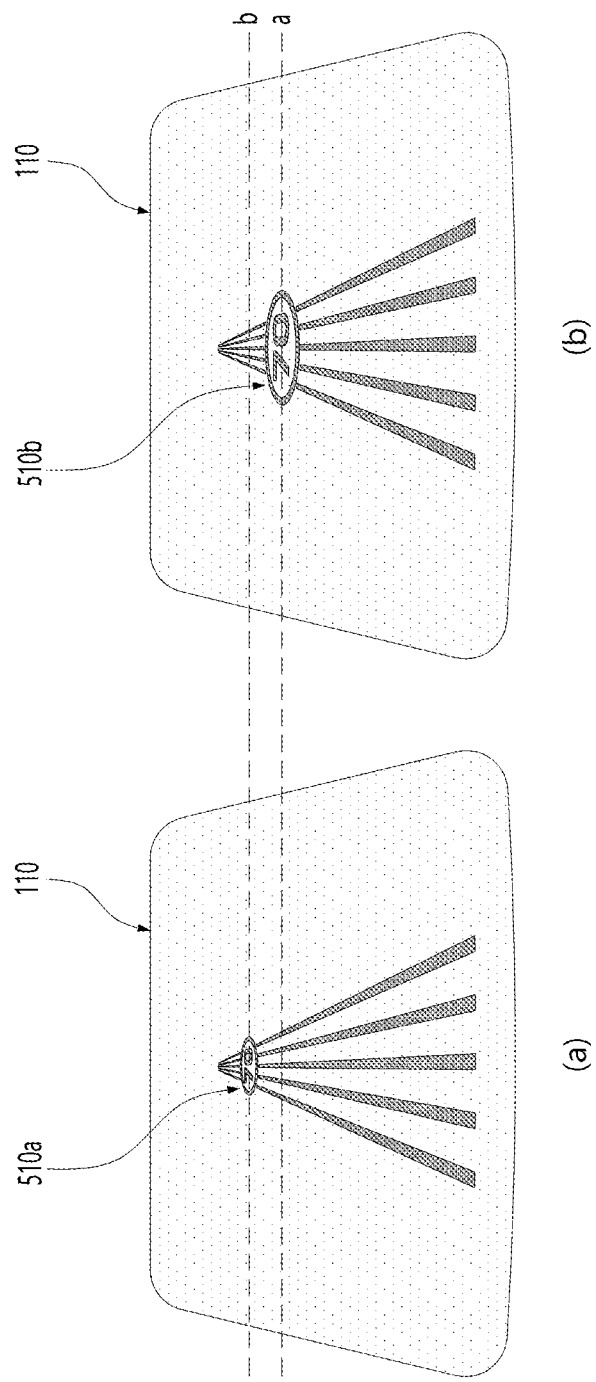

(a)

(b)

(a)

(b)

(a)

(b)

METHOD AND SYSTEM FOR CONTROLLING HEAD UP DISPLAY

CROSS-REFERENCE TO RELATED APPLICATIONS

This is a continuation application of International Application No. PCT/KR2020/015453, filed Nov. 6, 2020, which claims the benefit of Korean Patent Application No. 10-2020-0129885, filed Oct. 8, 2020.

BACKGROUND OF THE INVENTION

Field of Invention

The present invention relates to a method of controlling a head-up display which outputs information in front of a driver, and a control system thereof.

Description of Related Art

A Head-Up Display (HUD) for a vehicle indicates a device which transmits information to a driver by projecting an image outputted from a display to a windshield or a combiner which is located in front of a driver in the form of a graphic image, through an optical system.

Here, the optical system may be configured as a plurality of mirrors or lenses in order to change an optical path of an image outputted from a display. Such a head-up display for a vehicle has advantages to induce a driver's immediate reactions and to provide convenience.

In a general head-up display (HUD) for a vehicle, an image is fixedly positioned about 2-3 m in front of a driver. On the other hand, at the time of driving, various events (e.g., a speed limit, a pedestrian's emergence, etc.) surrounding a vehicle occur at a random position. Thus, a method of providing information in a fixed manner on the same position has a limitation in effectively providing event-related information.

Accordingly, research about a method of providing event-related information to a driver more effectively by interworking with events is actively ongoing. For instance, Korean Laid-Open Patent No. 10-2015-0054022 (Publication date: May 20, 2015) relates to a device of displaying lane change information using a head-up display, and a method thereof, which provides a method of displaying lane change information as augmented reality (AR) by matching to a real lane position. Thus, research about a method of displaying event information by matching to an event-occurrence position is being actively ongoing.

BRIEF SUMMARY OF THE INVENTION

The present invention relates to a method of controlling a head-up display capable of providing information on various events which occur in a space where a vehicle runs, to a driver more intuitively and effectively, and a system thereof.

More specifically, the present invention is to provide a method of controlling a head-up display capable of allowing a driver to apprehend an event and real position information related to the event, and a system thereof.

Further, the present invention is to provide a method of controlling a head-up display capable of allowing a driver to recognize an event and real position information related to the event even while driving a vehicle, and a system thereof.

The present invention is to provide a method of controlling a head-up display capable of minimizing data processing for providing event information, and a system thereof.

In order to achieve the above tasks, a method of controlling a head-up display according to the present invention may provide information related to a vehicle while driving by referring to a specific map.

The method may include sensing occurrence of an event related to the vehicle; updating event information related to the event, to the specific map, in response to the event occurrence; outputting the event information to a preset position in front of the vehicle, by using the head-up display; maintaining the output of the event information at the preset position, even if a relative distance between the vehicle and the preset position is changed based on the driving of the vehicle; and terminating the output of the event information when the vehicle passes through the preset position.

Further, a control system of a head-up display according to the present invention may provide information related to the driving of the vehicle.

The control system may include a head-up display configured to provide information related to the driving of a vehicle; a storage unit configured to store a specific map therein; and a controller configured to output event information on an event related to the vehicle to a preset position in front of the vehicle, by using the head-up display, in a case that occurrence of the vehicle-related event is sensed.

Here, the controller may maintain the output of the event information at the preset position, even if a relative distance between the vehicle and the preset position is changed based on the driving of the vehicle. And the controller may control the head-up display such that the output of the event information is terminated when the vehicle passes through the preset position.

Further, the present invention may provide a program which can be stored in a computer-readable medium, and executed by one or more processes in an electronic device. The program may include commands configured to: sense occurrence of an event related to a vehicle; update event information related to the event, to a specific map, in response to the event occurrence; output the event information to a preset position in front of the vehicle, by using a head-up display; maintain the output of the event information at the preset position, even if a relative distance between the vehicle and the preset position is changed based on the driving of the vehicle; and terminate the output of the event information when the vehicle passes through the preset position.

In the method and system of controlling a head-up display according to the present invention, event information may be output to a specific position related to an event, even while the vehicle is running. More specifically, in the method and system of controlling a head-up display according to the present invention, an output state of event information to a specific position related to an event may be maintained even while the vehicle is running, by using an absolute coordinate. This may allow a driver to be provided with event information in an interworking manner with a situation even while driving the vehicle, thereby enabling the driver to handle the situation with respect to the event.

Further, in the method and system of controlling a head-up display according to the present invention, event information may be added to a specific map based on an event occurrence, and may be deleted from the specific map based on an exposure release condition of the event information. In the present invention, data may be managed more efficiently as event information is instantly registered or deleted according to an event occurrence or an event termination.

Further, in the method and system of controlling a head-up display according to the present invention, processing of event information customized for a specific vehicle, such as registering or deleting event information to/from a downloaded specific map may be performed. In this case, event information for only a specific vehicle is registered to or deleted from a pre-downloaded specific map. This may minimize computation amount of data processing, thereby enabling event information to be provided more rapidly and efficiently.

BRIEF DESCRIPTION OF THE DRAWINGS

FIGS. 4 and 5A to 5D are conceptual views for explaining an event information displaying method in a head-up display according to the present invention.

DETAILED DESCRIPTION OF THE INVENTION

Figure 1:
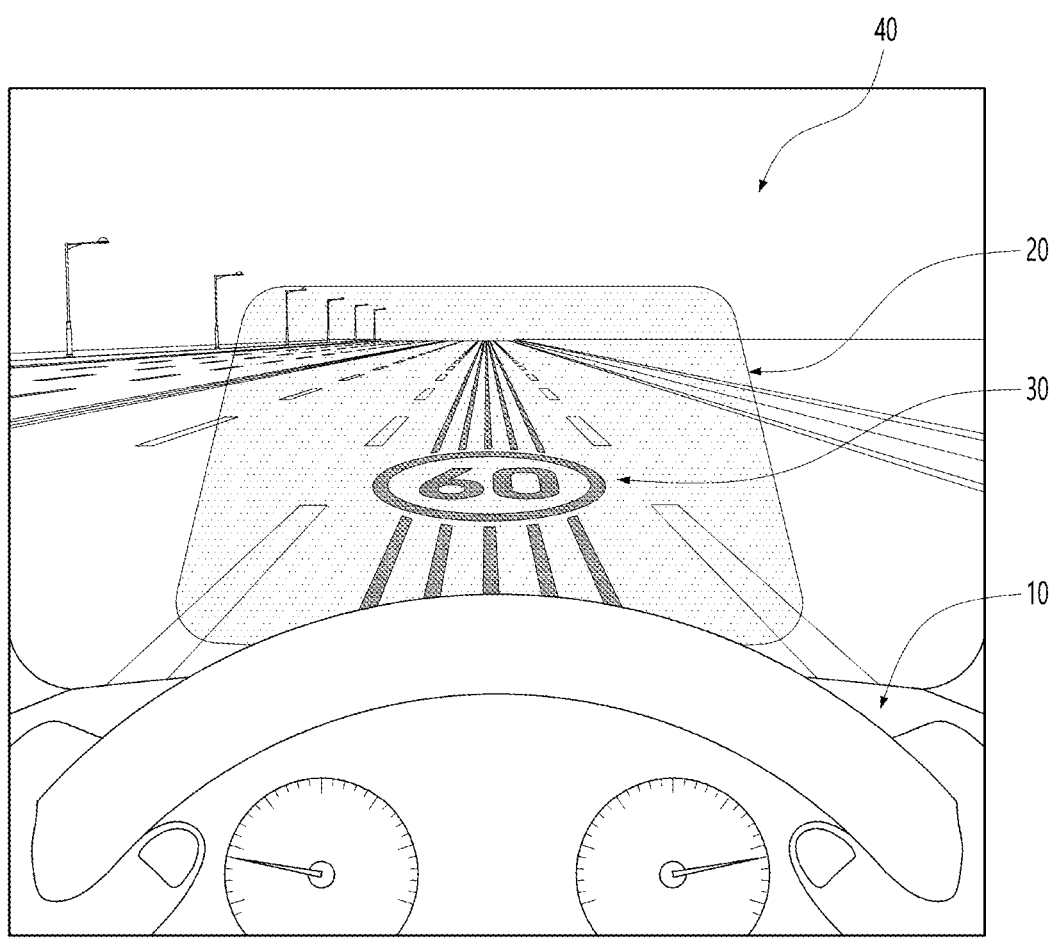
FIG. 1 is a conceptual view for explaining an image implemented in a head-up display according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

The present invention relates to a method and system of controlling a head-up display, and more particularly, to a head-up display which outputs visual information in front of a driver in a vehicle.

Here, the Head-Up Display (HUD) is a screen display device installed in front of a driver or pilot in a vehicle or an airplane, which means a display to allow the driver or pilot to view various information with the head positioned up. In the present invention, the head-up display is applied to a vehicle, and an automobile is shown as an example for convenience. However, the present invention is not limited to this. For instance, the vehicle may be one of various types such as an automobile, a motorcycle, an electric kickboard, an electric bicycle, an electric wheelchair, an helicopter, an airplane, a ship, construction equipment, a mobile robot, or any other driving devices which transports a driver.

The head-up display according to the present invention is a device capable of allowing a driver or a user (hereinafter, will be referred to as a "driver") to recognize various information with the driver's head positioned up, and is applicable to various types of vehicles. However, for convenience, the method and system of controlling a head-up display according to the present invention will be explained in more detail with an automobile as an example.

Figure 2A:
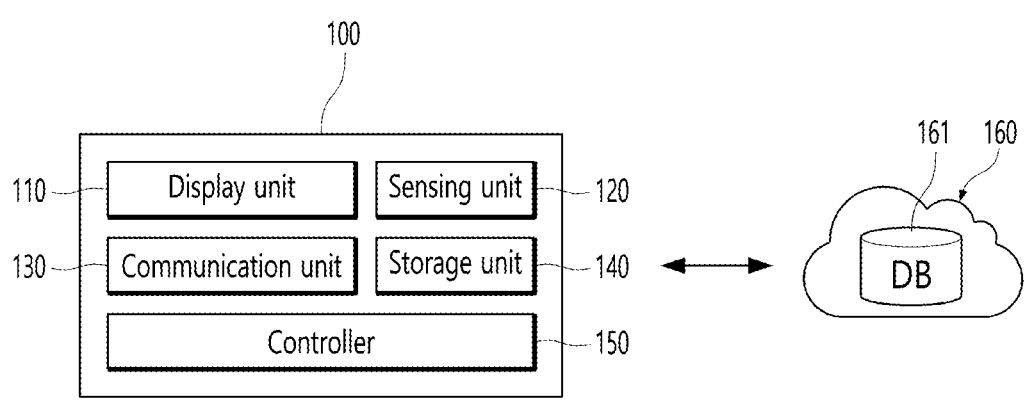
FIG. 2A is a block diagram of a control system of a head-up display according to the present invention.
Figure 2B:
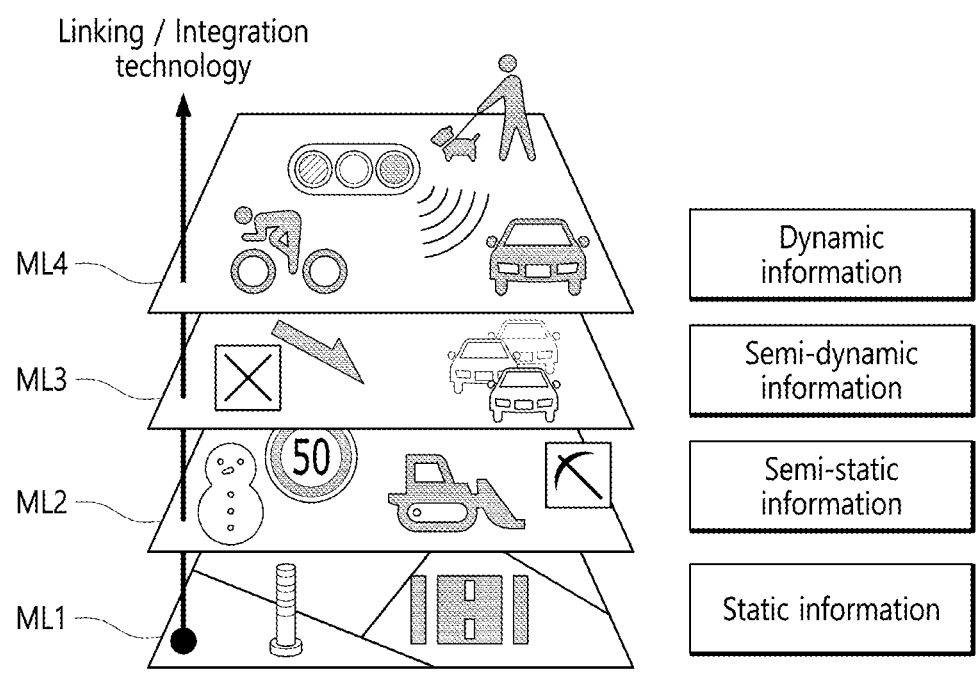
FIG. 2B is a conceptual view showing an embodiment of a specific map according to the present invention.

FIG. 1 is a conceptual view for explaining an image implemented in a head-up display according to the present invention. FIG. 2A is a block diagram for explaining a control system of a head-up display according to the present invention (hereinafter, will be referred to as a "control system"), and FIG. 2B is a conceptual view showing an embodiment of a specific map according to the present invention.

As shown in FIG. 1, visual information 30 may be output by using a display device such as a combiner 20. In the case that the visual information 30 is output through the combiner 20, a driver of a vehicle 10 who sits on a driver seat may recognize that a virtual image exists in front of the vehicle 10. Thus, the driver may be provided with various information while driving the vehicle 10, through the virtual image corresponding to the visual information 30 in front of the vehicle 10.

In this embodiment, the visual information 30 is output by using the combiner 20. However, in the present invention, there is no limitation in outputting visual information. A method using a windshield may be applicable to the present invention.

Hereinafter, a display device of the type of combiner 20 and a display device of the type of windshield will not be strictly differentiated from each other, but will be referred to as a "head-up display" or a "display unit".

A surrounding space 40 where the vehicle 10 is located may be defined as a 2-dimensional (2D) space and a 3D space. Here, the 2D space may be a driving surface on which the vehicle 10 runs, and the 3D space may be a stereoscopic space where the vehicle 10 runs. Here, the driving surface may be referred to as a ground surface, and may be understood as a surface with which wheels of the vehicle 10 come in contact. In the present invention, the visual information may be output such that a virtual image is formed with respect to at least one of a 2D space and a 3D space, and there is no specific limitation thereto.

Hereinafter, for convenience, "information" output from a head-up display, and a "virtual image" formed in front of the vehicle will be referred to as "information" without a differentiation.

As shown in FIG. 2A, a control system 100 according to the present invention may include at least one of a display unit 110, a sensing unit 120, a communication unit 130, a storage unit 140 and a controller 150.

As shown in FIG. 1, the display unit 110 is a display device for forming information in front of the vehicle 10, and may mean a head-up display. The display unit 110 may be implemented as one of a combiner type and a windshield type.

Next, the sensing unit 120 may include at least one sensor. The sensing unit 120 is for sensing information on the surrounding space 40 of the vehicle 10, and may include at least one of an image sensor (or a camera), a lidar sensor, a speed sensor, an acceleration sensor, a geomagnetic sensor, a GPS sensor or an ultrasonic sensor. Alternatively, the sensing unit may further include various other sensors as well as the aforementioned sensors.

In the present invention, sensing information is not necessarily sensed by the sensor provided at the control system 100. Rather, sensing information sensed by a sensor provided at the vehicle 10 itself may be utilized. Thus, in the present invention, a sensor type and whether a sensor is provided at the control system 100 or the vehicle 10 will not be clearly classified. Therefore, in the present invention, the sensing unit 120 may be configured to sense information by using a sensor provided at one of the vehicle 10 and the control system 100.

Next, the communication unit 130 may be configured to perform at least one of a wired communication and a wireless communication. The communication unit 130 may support a variety of communication methods according to a communication specification of a device with which it communicates. For instance, the communication unit 130 may be configured to communicate using at least one of WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), 5G (5th Generation Mobile Telecommunication), Bluetooth™, RFID (Radio Frequency Identification), IrDA (Infrared Data Association), UWB (Ultra-Wideband), ZigBee, NFC (Near Field Communication), Wi-Fi Direct, and Wireless USB (Wireless Universal Serial Bus).

Further, the communication unit 130 may include a GPS (Global Positioning System) module for obtaining position information of a vehicle or a DGPS (Differential Global Positioning System) module.

Next, devices with which the communication unit 130 communicates may vary. For instance, the communication unit 130 may be configured to communicate with at least one of an external server (or a cloud server 160) and an external storage unit (or a cloud storage unit 161). In the present invention, for convenience of explanations, "external server", "cloud server", "external storage unit", and "cloud storage unit" will be referred to as a cloud server 160.

The communication unit 130 may download at least a part of a specific map, or at least a part of information included in a specific map, through communications with the cloud server 160.

Next, the storage unit 140 may be configured to store various information related to the present invention. In the present invention, the storage unit 140 may be equipped at the control system 100 itself. In contrast, at least a part of the storage unit 140 may mean the cloud server 160. That is, it can be understood that the storage unit 140 is sufficient if necessary information for event provision according to the present invention is stored, and there is no constraint on a physical space. Thus, the storage unit 140 and the cloud server 160 are not separately identified, but all are described as the storage unit 140. Here, the cloud server 160 may mean "cloud storage" as aforementioned.

Hereinafter, information stored in the storage unit 140 will be explained in more detail.

Firstly, the storage unit 140 may store a specific map therein. Here, a specific map may be a high definition (HD) map. A HD map means a 3-dimensional (3D) map having precision of a centimeter (cm) level. Such an HD map may include information of a lane unit such as a road center line and a road boundary line, and information such as a traffic light, a sign, a curb, a road mark and various types of structures.

The specific map may be provided with multi layers (ML1, ML2, ML3, ML4) categorized according to a change attribute of update information. In this case, the change attribute may be defined by a lapse of a time when the information change has occurred. In this case, the specific map may be provided with dynamic map data, and each of the multi layers (ML1, ML2, ML3, ML4) may be mapped with corresponding data. The specific map of the present invention is not limited to this, but can have a configuration of a single layer.

FIG. 2B explains dynamic map data, and the dynamic map data includes at least one of static information, semi-static information, semi-dynamic information and dynamic information. Here, the multi layers may have a structure where first layer (ML1), second layer (ML2), third layer (ML3) and fourth layer (ML4) corresponding to the static information, the semi-static information, the semi-dynamic information and the dynamic information are laminated on each other from the bottom to the top. The first to fourth layers (ML1~ML4) may be connected to one another by links and an integration technique.

The static information means information having no dynamic change despite a time lapse, and includes road surface information, lane information, a 3D structure, etc. as 3D map data of high definition. The static information constitutes basic information of a map such as image data, point cloud data, and a driving trajectory of a vehicle. The semi-static information, the semi-dynamic information and the dynamic information are dynamic data changed according to a time lapse, and may be overlapped with static information on the basis of position information.

On the basis of the length of the time lapse, the static information may be classified as information having no change for at least one month, the semi-static information may be classified as information which changes within one day or for about one hour, the semi-dynamic information may be classified as information which changes within one hour or for about one minute, and the dynamic information may be classified as information which changes within one minute.

For instance, the semi-static information may be traffic regulation information, road construction information, weather information of a wide area, etc., the semi-dynamic information may be accident information, traffic jam information, weather information of a narrow area, etc., and the dynamic information may be information surrounding a vehicle, pedestrian information, traffic light information, etc. Such information included in a specific map may exist in a matched manner with coordinates information. Such coordinates information is coordinates information of the real world, and may mean absolute coordinates. For instance, if information corresponding to a "traffic light" is included in a specific map, the specific map may include absolute coordinates corresponding to a spot where the "traffic light" is substantially positioned. The control system 100 of the present invention may provide visual information in front of a vehicle by referring to information included in a specific map.

Further, the storage unit 140 may include event information.

Here, an event may mean a situation or an incident that a driver should recognize when driving a vehicle.

For instance, events may be situations such as i) a case in which a driving speed of a vehicle exceeds a speed limit, ii) a case in which a vehicle does not keep a safe distance from a vehicle in front, iii) a case in which a vehicle violates a traffic signal, iv) a case in which a vehicle in front has made a sudden stop, v) a case in which an object (or an object obstacle) which interrupts driving is positioned on a road, vi) a case in which a person is located near a road, vii) a case in which a lane should be changed, and viii) a case in which an accident has occurred ahead. In the present invention, when the above various situations have occurred, it may be expressed as "events have occurred" or "vehicle-related events have occurred".

Events which may occur with respect to a vehicle have various types as well as the aforementioned examples. In the present invention, the events are not limited to the aforementioned examples. That is, the present invention may be applicable to various types of events which may occur with respect to a vehicle.

The storage unit 140 may include event information corresponding to different events. That is, the storage unit 140 may store therein event information matched with each event.

Here, event information may be configured as visual information for informing a driver that an event has occurred. The event information may include at least one graphic object (or graphic element).

For instance, speed limit information of a road where the vehicle 10 is running, and guidance information which informs a driver of an exceeded state of a speed limit may be matched to a speed limit exceeding event, as event information. As another example, a graphic object (or a graphic element) which informs the existence of an obstacle may be matched to an event which occurs based on the existence of an object (or an obstacle) which interrupts driving on a road, as event information. Thus, the storage unit may include event information matched with different events, respectively.

Event information may be updated to one of the multi layers (ML1, ML2, ML3, ML4) of the specific map. For instance, the event information of the present invention may be updated to one among the upper layers (ML2, ML3, ML4) of the multi layers (ML1, ML2, ML3, ML4). That is, the event information may be updated to one of the second to fourth layers (ML2, ML3, ML4) corresponding to semi-static information, semi-dynamic information and dynamic information.

The event information may be updated to one of the second to fourth layers (ML2, ML3, ML4) by matching information of the three upper layers (ML2, ML3, ML4) according to an event type. For instance, a speed limit, traffic restriction information may be provided at the second layer (ML2) as semi-static information, and event information indicating that a speed limit of a vehicle has exceeded the speed limit may be updated to the second layer (ML2). As another example, surrounding vehicle information may be provided at the fourth layer (ML4) as dynamic information, and event information instructing that a vehicle in the front has made a sudden stop may be updated to the fourth layer (ML4).

Next, the controller 150 may be configured to control the overall operations of the control system 100 related to the present invention. The controller 150 may process signals, data, information, etc. that are input or output through the aforementioned components, or provide or process appropriate information or functions to a driver.

Further, the controller 150 of the present invention may be configured to sense the occurrence of an event. As aforementioned, the controller 150 may sense (or determine) whether an event has occurred, based on information sensed by the sensing unit 120.

For sensing of an event occurrence, the controller 150 may sense whether an event has occurred, by comparing sensed information with reference information.

Here, the reference information is information which is used for consulting in order to sense the occurrence of an event, and has no specific limitation in its type.

For instance, the reference information may be information included in a specific map. As aforementioned, various information on a space where the vehicle 10 runs (e.g., reference driving information such as speed limit information, lane information and traffic signal information) may be included in a specific map. The controller 150 may determine whether an event related to the vehicle has occurred, by referring to reference driving information included in a specific map. That is, based on reference driving information included in a specific map, the controller 150 may determine whether the vehicle 10 is running according to the reference driving information. That is, in a case in which the vehicle 10 is not driving according to the reference driving information, an event may have occurred.

The controller 150 may sense whether an event has occurred, by comparing sensed information with information included in a specific map (or reference driving information). For instance, it is assumed that a specific map includes information indicating that the speed limit of the road where the vehicle 10 is currently driving is 60 km/h, and the current driving speed of the vehicle 10 sensed by the sensing unit 120 is 65 km/h. In this case, the controller 150 may determine that the vehicle 10 has exceeded the speed limit, and may sense the occurrence of an event based on such a determination.

For instance, reference information may be situation information serving as a criterion of an event determination and stored in the storage unit 140. Here, the situation information may mean information on an accident or a situation which may occur in a space surrounding the vehicle 10.

For instance, the situation information may include information on various situations such as whether there exists an object which interrupts the driving within a lane where the vehicle runs (or near the lane), or whether a pedestrian is approaching to a road where the vehicle runs.

The controller 150 may determine whether a situation corresponding to an event occurrence has occurred in a space surrounding the vehicle 10, based on information sensed by the sensing unit 120. Then, the controller 150 may sense that an event has occurred, based on the determination.

For instance, if it is sensed by the sensing unit 120 that an obstacle is positioned on a lane where the vehicle 10 runs, the controller 150 may sense that an event has occurred based on reference information.

If the occurrence of an event is sensed, the controller 150 may provide event information in front of the vehicle through the display unit 110, thereby allowing a driver to drive the vehicle while recognizing the event information.

Figure 3:
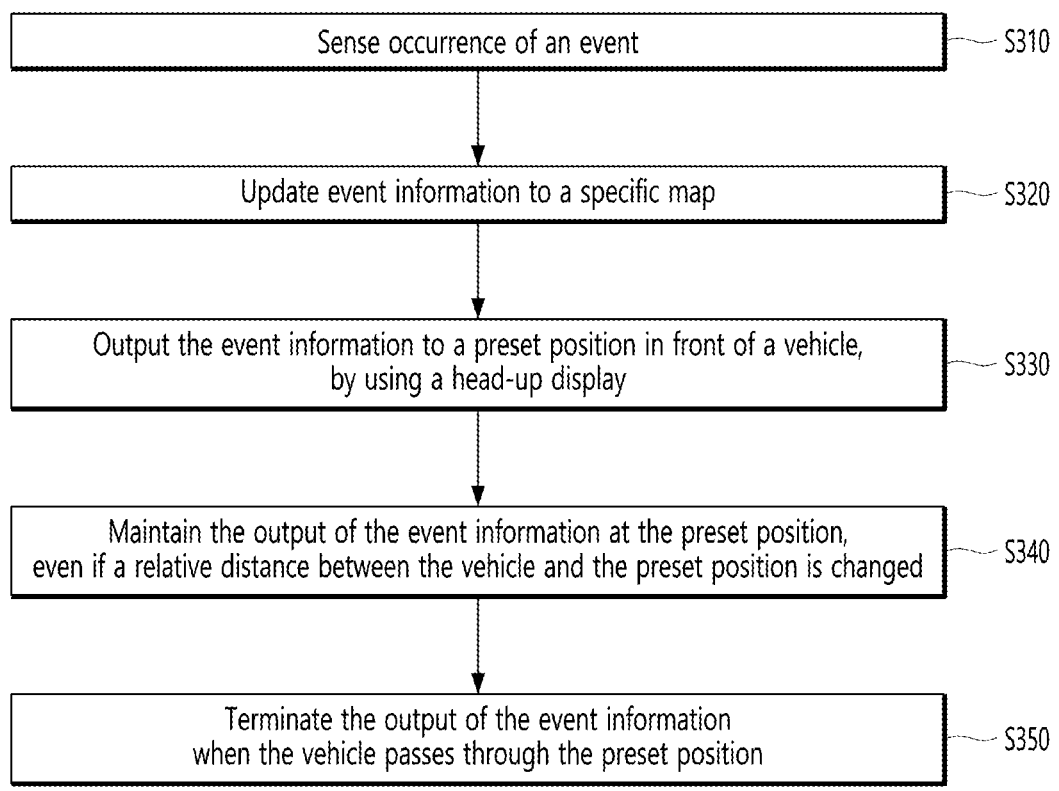
FIG. 3 is a flowchart for explaining a method of controlling a head-up display according to the present invention.

Hereinafter, an event information outputting method will be explained in more detail with reference to the attached drawings. FIG. 3 is a flowchart for explaining a method of controlling a head-up display according to the present invention. FIGS. 4 and 5A to 5D are conceptual views for explaining an event information displaying method in a head-up display according to the present invention. FIGS. 6A to 6F, 7A to 7C, 8A and 8B are conceptual views for explaining an event information displaying method according to an event type in a head-up display of the present invention.

Firstly, as shown in FIG. 3, in a method of controlling a head-up display according to the present invention (hereinafter, "a control method"), the occurrence of an event is sensed (S310). As aforementioned with reference to FIGS. 1 and 2, an event may mean a situation or an accident that a driver should recognize when driving a vehicle.

The controller 150 may sense (or determine) whether an event has occurred, based on information sensed by the sensing unit 120. More concretely, the controller 150 may sense the occurrence of an event by comparing sensed information with reference information.

The processes to sense the occurrence of an event have been explained in more detail with reference to FIGS. 1 and 2, and thus detailed processes will be replaced by the aforementioned explanations.

When the occurrence of an event is sensed, a process to update event information to a specific map may be performed in the control method of the present invention (S320).

More specifically, in response to the occurrence of an event, the controller 150 may update event information related to the occurred event to a specific map.

Here, the "update" of the event information to the specific map may be understood as inclusion, mapping or registration of the event information to the specific map.

That is, since event information is information generated or defined based on an event which occurs while the vehicle is running, i.e., moving or traveling, the event information may not be included in a first specific map. Thus, when an event occurs, the controller 150 may include event information on the occurred event in a specific map. This may be expressed as "update" in the present invention.

Here, as aforementioned, the specific map includes information on a surrounding space of where the vehicle 10 is running. The specific map may include not only geographical information on the surrounding space itself, but also various information required for driving the vehicle.

The controller 150 may be configured to output information to the display unit 110 based on information included in a specific map. That is, the controller 150 may be configured to provide information included in a specific map to a driver.

In order to provide event information to a driver, the event information should be included in a specific map. Thus, based on the occurrence of an event, the controller 150 may update the specific map such that event information on the occurred event is included in the specific map.

Meanwhile, the controller 150 may extract event information matched with the type (or contents) of the occurred event, from the storage unit 140, and may include the extracted event information in the specific map.

In the present invention, in order to include event information in a specific map, the controller 150 may specify a preset position where the event information is to be displayed, and may include information on the specified preset position together, in the specific map.

Here, the preset position is a coordinate of a space where the vehicle 10 runs, and may be configured as an absolute coordinate. The controller 150 may control an output position of event information such that the event information is positioned on a specific absolute coordinate of a space where the vehicle 10 runs.

Here, a preset position where event information is output may be variously defined. As an example, the controller 150 may specify a second absolute coordinate corresponding to a spot spaced from a first absolute coordinate corresponding to the current position of the vehicle 10 by more than a predetermined distance, as a preset position.

More specifically, the controller 150 may specify a first absolute coordinate corresponding to the current position of the vehicle 10, in response to the occurrence of an event. Here, the first absolute coordinate corresponding to the current position of the vehicle 10 may be specified based on information received from the aforementioned GPS module. The first absolute coordinate corresponding to the current position of the vehicle 10 may be also specified based on another sensor information other than GPS information, or through a combination of more than two sensor information. The controller 150 may specify a preset position where event information is to be output, based on the first absolute coordinate.

More specifically, the controller 150 may specify a second absolute coordinate corresponding to a spot spaced from the first absolute coordinate by a predetermined distance (or a preset distance) along the driving direction of the vehicle 10, as a preset position. And the controller 150 may perform mapping of the event information to a region corresponding to the second absolute coordinate in the specific map.

Here, the predetermined distance (or the preset distance) may be "150 m" spaced from the current position of the vehicle 10, along the driving direction of the vehicle 10, etc.

Specifying the distance of a spot spaced from the current position of the vehicle 10 as a preset position may be determined based on various standards. For instance, the controller 150 may specify an absolute coordinate corresponding to a spot spaced from "the vehicle 10 by a predetermined distance" as a preset position, without considering the situation of a road where the vehicle 10 runs, or a surrounding situation. In this case, whenever an event occurs, event information may be output to the absolute coordinate spaced from the current position of the vehicle by the predetermined distance.

As another example, the controller 150 may differently specify a preset position considering the situation of a road where the vehicle 10 runs, or a surrounding situation.

A case in which a speed limit exceeding event has occurred will be explained as an example. In a case in which information on a driving speed and a speed trap area is included in a specific map, the controller 150 may specify an absolute coordinate corresponding to a spot where the speed trap area is terminated, as a preset position.

The controller 150 may specify a preset position where event information is to be displayed, by using absolute coordinate information included in a specific map. In this case, the controller 150 may not consider an absolute coordinate of the vehicle 10, in order to specify the preset position.

As another example, the preset position may be a position where a new absolute coordinate is generated and information is displayed according to a real-time event. More specifically, the preset position may be differently specified while considering a road situation or a surrounding situation. As an example, in the case of displaying information at a spot spaced from the vehicle 10 by 100 meters, if a vehicle ahead exists within the distance of 100 meters, a specific position within an interval from the vehicle ahead may be specified as a preset position, in order to prevent overlapping with the vehicle ahead.

As still another example, the controller 150 may specify a preset position by referring to a position of an object (an obstacle or a pedestrian, etc.) by which an event has occurred. For instance, when an event in which an object is located at a lane where the vehicle 10 runs or near a road, the controller 150 may specify an absolute coordinate corresponding to the spot where the object is located, as a preset position. In this case, the controller 150 may extract the absolute coordinate corresponding to the spot where the object is located, based on object sensing information sensed by the sensing unit 120.

The controller 150 may specify an absolute coordinate corresponding to a preset position where event information is to be output, based on various methods, and the controller 150 may perform mapping (include or register) event information to a spot (or a region) corresponding to the specified absolute coordinate, in a specific map.

Here, the event information may be mapped to not only the spot (or the region) corresponding to the specified absolute coordinate, but also a partial area including the specified absolute coordinate in the specific map. That is, a preset position corresponding to a specific absolute coordinate is a reference position where event information is displayed, and event information may be displayed at a partial area including the reference position.

For instance, the controller 150 may specify at least a partial region between a first absolute coordinate corresponding to the current position of the vehicle, and a second absolute coordinate corresponding to the specified absolute coordinate, as a region where event information is mapped.

As aforementioned, in a case in which event information has been updated to a specific map, in the control method of the present invention, the event information may be output to a preset position in front of the vehicle (S330).

By referring to the event information included in the specific map and the absolute coordinate matched with the event information, the controller 150 may control the display unit 110 such that the event information is located at a preset position corresponding to the absolute coordinate. Thus, when an event occurs, the controller 150 may output the event information to the preset position by referring to the specific map. As aforementioned, the event information may be displayed at a partial area including the preset position.

In the present invention, the event information may be mapped to not only one spot corresponding to a specified absolute coordinate, but also a partial area in the specific map.

Figure 4:
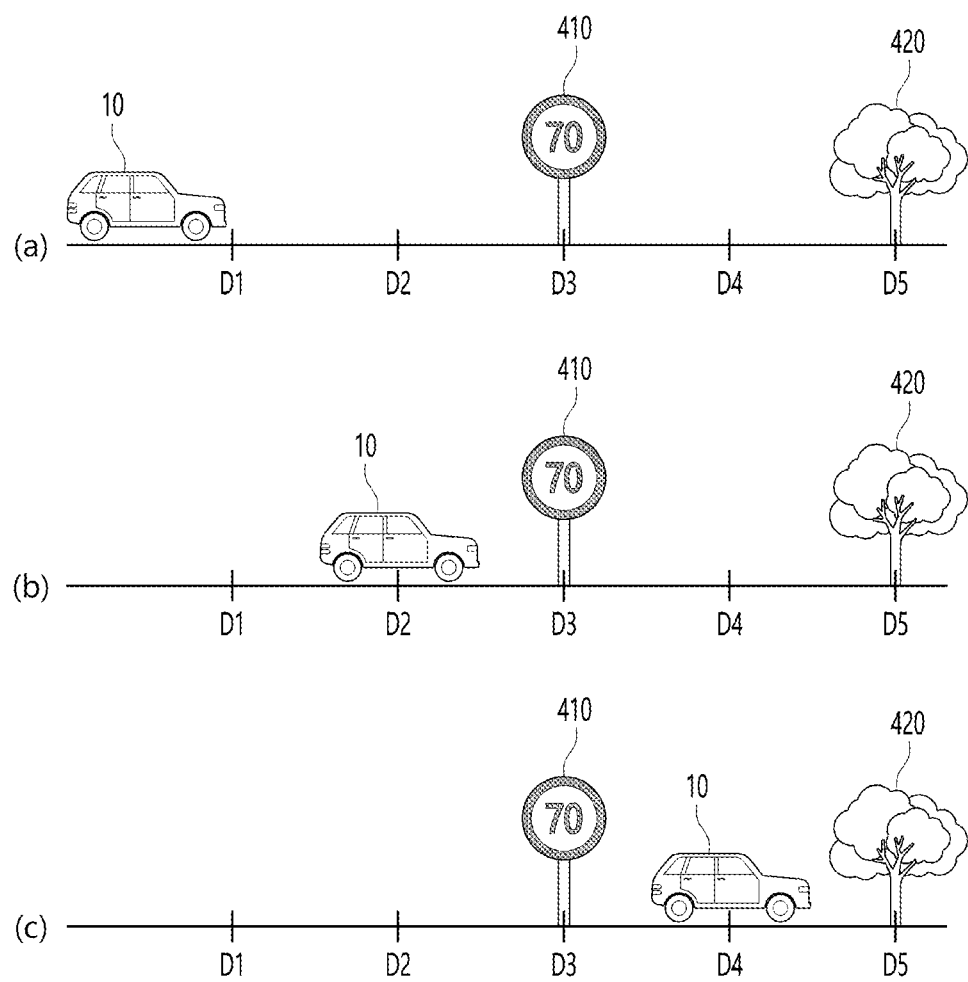

For detailed explanations, a case in which a speed limit exceeding event has occurred will be described. As shown in FIG. 4(*a*), it is assumed that a speed limit exceeding event has occurred as the vehicle 10 exceeds a speed limit on a first absolute coordinate corresponding to D1.

In this case, the controller 150 may specify a preset position where event information is to be displayed, and may perform mapping of the event information onto an absolute coordinate corresponding to the preset position in the specific map. Here, it is assumed that the preset position is a second absolute coordinate corresponding to D3, as shown in FIG. 4(*a*).

Figure 5A:
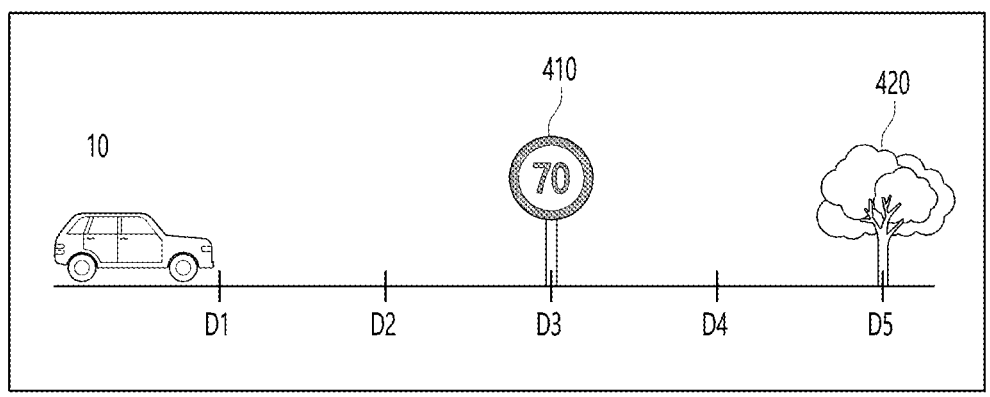
Figure 5A:
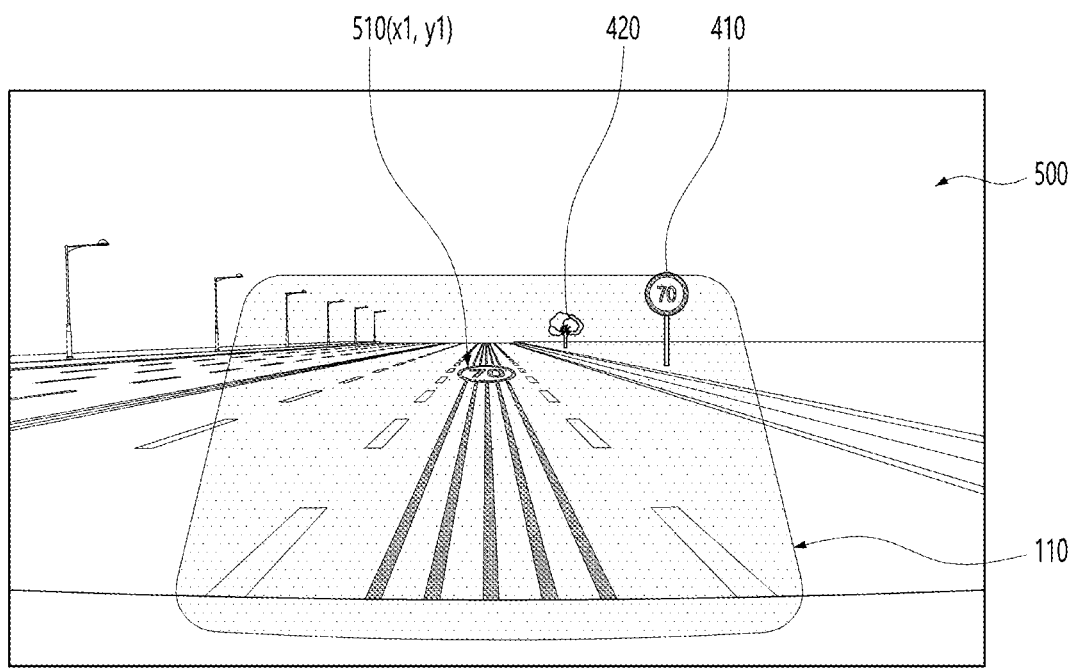

In this case, the second absolute coordinate may be a point where an object 410 corresponding to a speed limit sign is located in a real space. As shown in FIG. 5A(*b*), the controller 150 may output event information 510 to a preset position where the object 410 is located. As shown, the event information 510 may be displayed on not only a preset position, but also a partial area including the preset position. For instance, the event information may be a graphic object having a number indicating a speed limit in a circle. Also, the graphic object may be provided with a plurality of lines extending from the circle back and forth along lanes.

In this case, the controller 150 may specify a partial region from a first absolute coordinate corresponding to a current position of the vehicle, as a region where event information is mapped. Thus, the controller 150 may output event information to the partial region, based on information mapped to a specific map.

Meanwhile, the controller 150 may output, to the display unit 110, only event information mapped to an absolute coordinate included within a preset distance or region from an absolute coordinate corresponding to the current position of the vehicle, among information included in the specific map. For instance, the controller 150 may selectively output, to the display unit 110, an event having an absolute coordinate within a preset distance (e.g., 30 m) from the current position of the vehicle 10, among event information included in the specific map. Here, the preset distance or region is a region where event information can be seen from a driver's viewpoint, and is variable according to the controller 150 or a driver's selection.

Next, in the control method of the present invention, even though a relative distance between the vehicle and the aforementioned preset position is changed, output of event information may be maintained at the preset position (S340).

Here, "output of event information is maintained at the preset position" may mean that the event information is continuously output to the preset position even though the position of the vehicle is changed according to a time lapse.

Figure 5B:
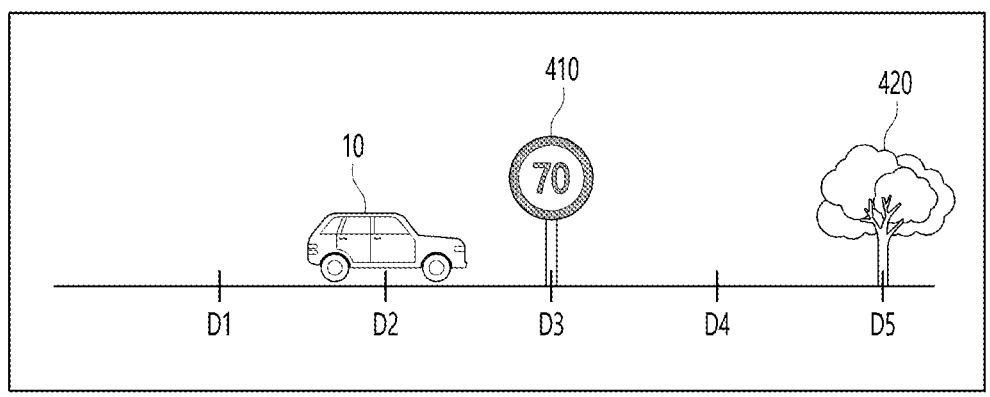
Figure 5B:
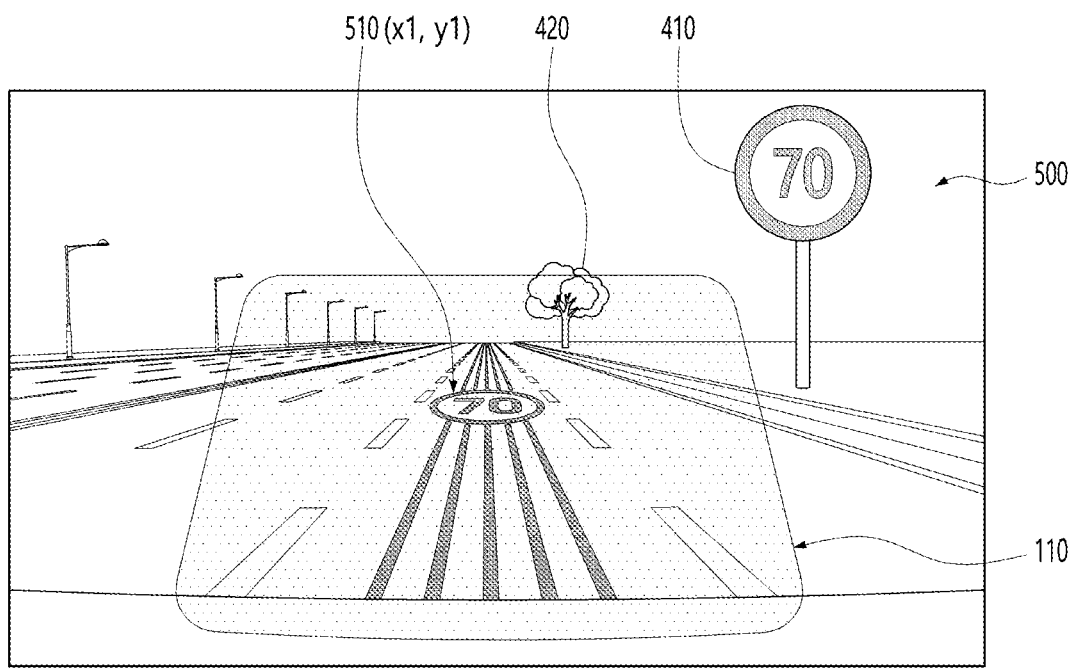

For instance, as shown in FIG. 5A(*a*), at a first time (t1) when the vehicle is located at D1, the event information is output to the preset position (D3). Then, at a second time (t2), the event information may be output to the same preset position. More specifically, as shown in FIG. 5B(*a*), the vehicle is located at D2 at the second time (t2). In this case, the event information is still output to the preset position (D3).

Between the first time (t1) and the second time (t2), a front view recognized by the driver is changed based on the driving of the vehicle, e.g., the distance to the signboard is changed, etc. However, despite such an appearance change, the event information may be output to the preset position (D3) at each time.

Here, the process of maintaining output of event information at the preset position (S340) may be a process of controlling an output attribute of the event information outputted through the display unit 110, such that the event information is located at the preset position corresponding to the second absolute coordinate from the viewpoint of the driver of the vehicle.

For instance, an output attribute of the event information outputted through the display unit 110 is controlled, in order to fix an output point of the event information to the second absolute coordinate, despite the driving of the vehicle. In this case, the output attribute of the event information may be an attribute related to at least one of an output position and an output size of the event information on the display unit 110.

More specifically, referring to FIG. 5A(b), the event information 510 is output to the preset position. As an example, a circle and a number of the event information 510 may be output to an absolute coordinate corresponding to (x1, y1). Then, if the vehicle is located at D2 at the second time (t2), the vehicle 10 becomes closer to the coordinate (x1, y1) as shown in FIG. 5B(b). However, the event information 510 may still be output to the coordinate (x1, y1).

In this manner, the output position of the event information may be controlled to maintain the coordinate (x1, y1), even though the vehicle 10 becomes closer to the coordinate (x1, y1). That is, as the vehicle moves towards the second absolute coordinate from the first absolute coordinate, the output position of the circle and the number may be fixed to the second absolute coordinate.

On the contrary, as the vehicle 10 moves towards the second absolute coordinate from the first absolute coordinate, an output size of the event information may be changed. That is, as the vehicle 10 moves towards the second absolute coordinate from the first absolute coordinate, the controller 150 may change the output size of the event information.

More specifically, the size of the graphic object shown in FIG. 5B(b) is larger than that of the graphic object shown in FIG. 5A(b). This allows a driver to receive information as an image more similar to the reality. In this case, the output size of the event information may be set based on a distance between the first absolute coordinate and the second absolute coordinate.

As aforementioned, when the vehicle 10 moves towards the second absolute coordinate from the first absolute coordinate, the output attribute of the event information may be changed such that the event information is located at the preset position. As an example, the aforementioned output process may be implemented as the controller 150 displays an image (event information) on the display unit 110 repeatedly per frame, by considering the current position of the vehicle, the direction, the field of view (FOV) of the head-up display, and the position (absolute position) of event information on the map.

For a driver's recognition that the output position of the event information is fixed and the output size is changed in front of the vehicle, a graphic object corresponding to the event information outputted to the display unit 110 may be moved on the display unit 110 according to the driving of the vehicle. For instance, as shown in FIGS. 5D(a) and (b), the graphic object outputted to 'b' of the display unit 110 at the first time (t1) may be moved to 'a' of the display unit 110 at the second time (t2) to thus be output.

Next, in the control method of the present invention, when the vehicle passes through the preset position where the event information is output, the output of the event information may be terminated (S350).

Here, the "termination of the output of the event information" may mean that the event information is not output any longer to the preset position. In this case, the controller 150 may control the display unit 110 not to output the event information any longer.

While the vehicle is running, the controller 150 may collect an absolute coordinate corresponding to the current position of the vehicle in real-time or at preset time intervals, and may compare the collected absolute coordinate with an absolute coordinate corresponding to a preset position where the event information has been output. The controller 150 may determine whether the vehicle 10 has passed through the preset position, based on the result of the comparison.

Figure 5C:
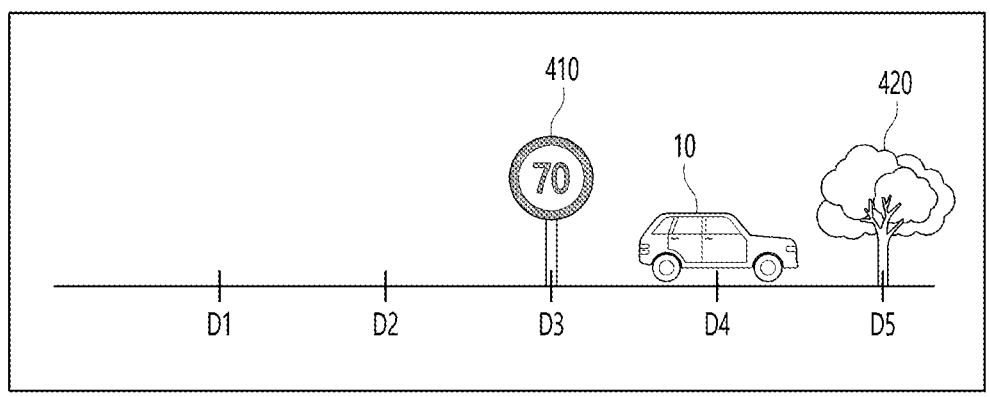
Figure 5C:
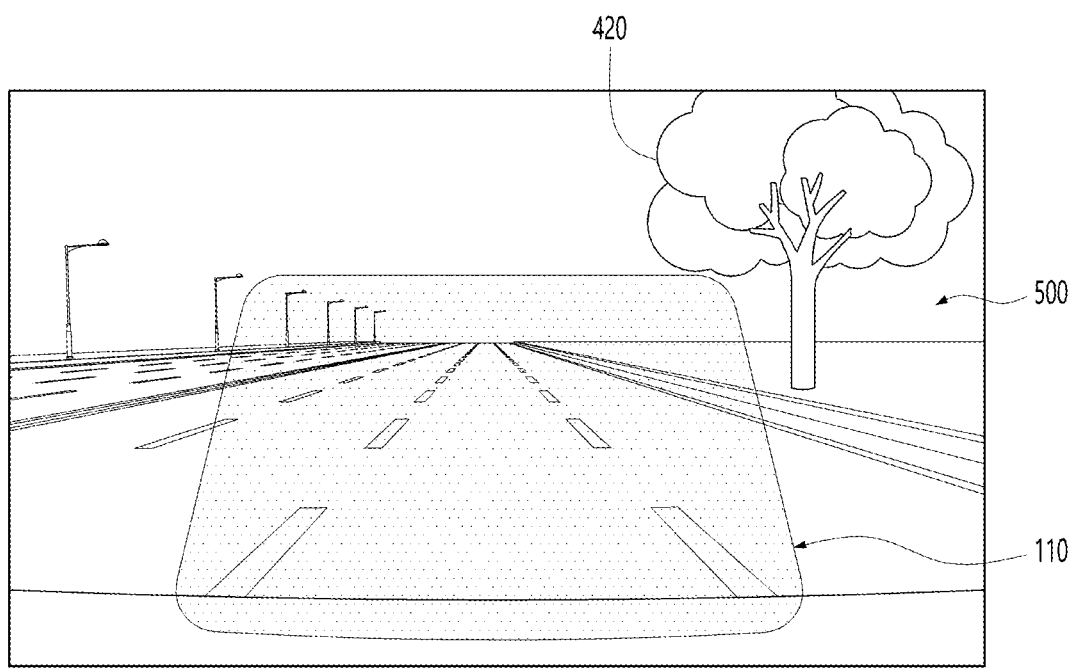

For instance, if the vehicle 10 has passed through an absolute coordinate corresponding to a preset position (D3) as shown in FIG. 5C(a), event information may not be output to the display unit 110 any longer as shown in FIG. 5C(b).

In a case in which an event does not exist any longer (or an event is terminated), the controller 150 may terminate an output of event information, even before the vehicle 10 passes through a preset position where the event information has been output.

For instance, in a case in which the vehicle 10 is running within the speed limit before passing through the preset position (D3), the controller 150 may not output event information corresponding to an over-speed any longer.

As another example, if an event does not exist any longer (or an event is terminated (e.g., the vehicle 10 is running within the speed limit)), in an output state of event information corresponding to an over-speed, the controller 150 may maintain the event information output to the display unit 110. In this case, even though the vehicle 10 is running within speed limit, the output state of the event information corresponding to an over-speed may be maintained on the display unit 110.

Referring to FIG. 4, if an event is terminated in an output state of event information to D3 of the display unit 110, the controller 150 maintains the output state of the event information to D3, under a condition that the position of D3 is within an FOV of the head-up display. Here, event information on the remaining positions (D1, D2, D4, D5) may not be output even though the positions are within the FOV of the head-up display. In a case where the vehicle 10 has passed through the preset position, the controller 150 may delete event information mapped to a specific map, from the specific map. The controller 150 performs mapping of event information to a specific map when an event occurs (i), and deletes the mapped event information from the specific map when the event is terminated or when the vehicle 10 has passed through a preset position (ii). This may allow data on the specific map to be managed efficiently. In this manner, in the method and system of controlling a head-up display according to the present invention, event information may be added to a specific map based on an event occurrence, and may be deleted from the specific map when an output of the event information is terminated. Thus, in the present invention, data may be managed more efficiently as event information is instantly registered or deleted according to an event occurrence or an event termination.

However, the present invention is not limited to this. For instance, event information which satisfies a specific condition can be newly registered as fixed information without being deleted from a map. In the case of an event which occurs frequently or an event which occurs with a pattern may be newly registered as information that corresponding event information is fixed to a map.

As aforementioned, in the method and system of controlling a head-up display according to the present invention, event information may be output to a specific position related to an event, even while the vehicle is running. More specifically, in the method and system of controlling a head-up display according to the present invention, an output state of event information to a specific position related to an event may be maintained even while the vehicle is running, by using an absolute coordinate. This may allow a driver to be provided with event information in an inter-working manner with a real situation even while driving the vehicle, thereby enabling the driver to perform an immediate handling with respect to an event.

Further, in the method and system of controlling a head-up display according to the present invention, processing of event information customized for a specific vehicle, such as registering or deleting event information to/from a downloaded specific map may be performed.

Hereinafter, various embodiments about an event corresponding to a situation or an accident which should be recognized by a driver when driving a vehicle, and event information output in correspondence thereto will be explained in more detail.

Figure 6A:
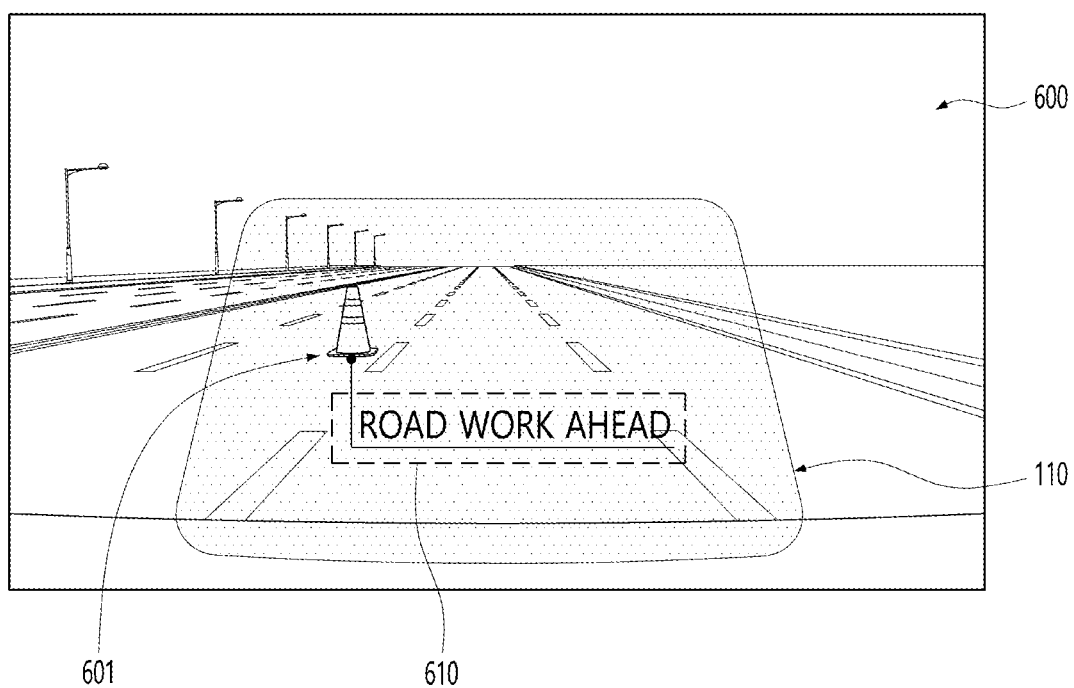
FIGS. 6A to 6F, 7A to 7C, 8A and 8B are conceptual views for explaining an event information displaying method according to an event type in a head-up display of the present invention.

As shown in FIG. 6A, the controller 150 may sense, by using the sensing unit 120, that an object (an obstacle or a thing 601) is positioned on a lane where the vehicle 10 runs or near a road. The controller 150 may determine whether a situation corresponding to an event has occurred in a space 600 where the vehicle 10 runs, based on sensing information sensed by the sensing unit 120. Then, the controller 150 may sense the occurrence of an event based on the determination. More specifically, the controller 150 may sense that an event has occurred based on reference information stored in the storage unit 160. As aforementioned, the reference information may be situation information serving as a criterion of an event determination and stored in the storage unit 140. Here, the situation information may mean information on an accident or a situation which may occur in the space 600 where the vehicle 10 runs.

If an event occurrence in front of the vehicle 10 is sensed based on such reference information and sensing information, the controller 150 may output information 610 on the occurred event to the display unit 110.

In a case where the object 601 is sensed, the controller 150 may determine whether the size of the object 601 is more than a preset standard size. Here, the preset standard size is a value large enough to interrupt driving of the vehicle 10, and may be variously set. The controller 150 can determine that an event has occurred when the size of the sensed object 601 exceeds the preset standard size.

The controller 150 may specify an absolute coordinate of a spot where the object 601 is located, based on sensing information. In this case, the controller 150 can also extract the absolute coordinate of the object 601, based on an absolute coordinate corresponding to a current position of the vehicle 10. For instance, when sensing information includes distance information from the vehicle 10, other than information corresponding to the absolute coordinate of the object 601, the controller 150 may calculate the absolute coordinate of the object 601 by using the absolute coordinate of the vehicle 10 and the distance information.

Then, the controller 150 may specify the absolute coordinate of the object 601, or an absolute coordinate corresponding to a region adjacent to the absolute coordinate of the object 601, as a preset position where event information 610 related to the object 601 is to be output. Thus, the event information 610 may be output to a predetermined region including the preset position.

As shown in FIG. 6A, the event information 610 may include guidance information indicating the existence of the object 601, or may include situation information related to the object (e.g., road work).

Figure 6B:
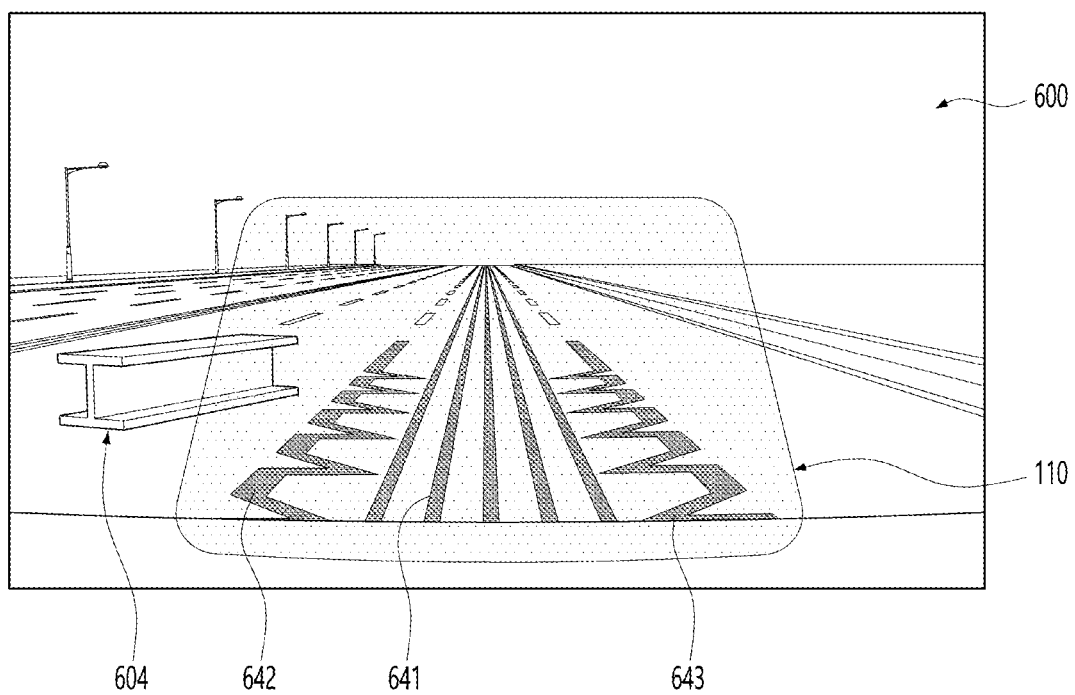

Further, as shown in FIG. 6B, event information may include at least one graphic object (or a graphic element) 641, 642, 643. The graphic objects 641, 642, 643 may be displayed near an object 604 as shown. As shown, the controller 150 may locate the graphic objects 641, 642, 643 at lanes adjacent to the object 604. A driver may pay more heed when driving on the lanes where the graphic objects 641, 642, 643 are located in a displayed state in a width direction.

Figure 6C:
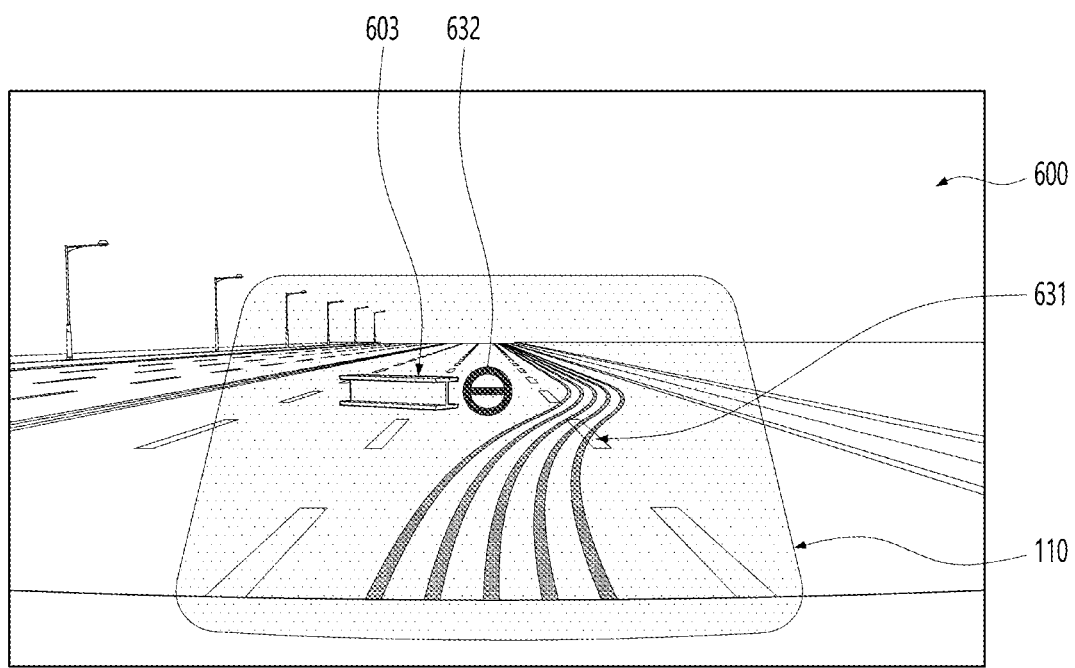

Further, as shown in FIG. 6C, event information may include detour information 631, 632 on an object 603. If it is sensed that the object 603 is located on a lane where the vehicle 10 runs, the controller 150 may generate detour information for bypassing the object 603 or the corresponding lane, as event information. Then, the controller 150 may output the generated information to the display unit 110.

Further, in a case where the output state of the event information to the preset position is maintained even while the vehicle 10 is running and the vehicle 10 passes through the preset position, the controller 150 may control the display unit 110 to terminate the output of the event information. Thus, a driver may drive with recognizing the object 603, until before the vehicle 10 passes through the preset position.

Figure 6D:
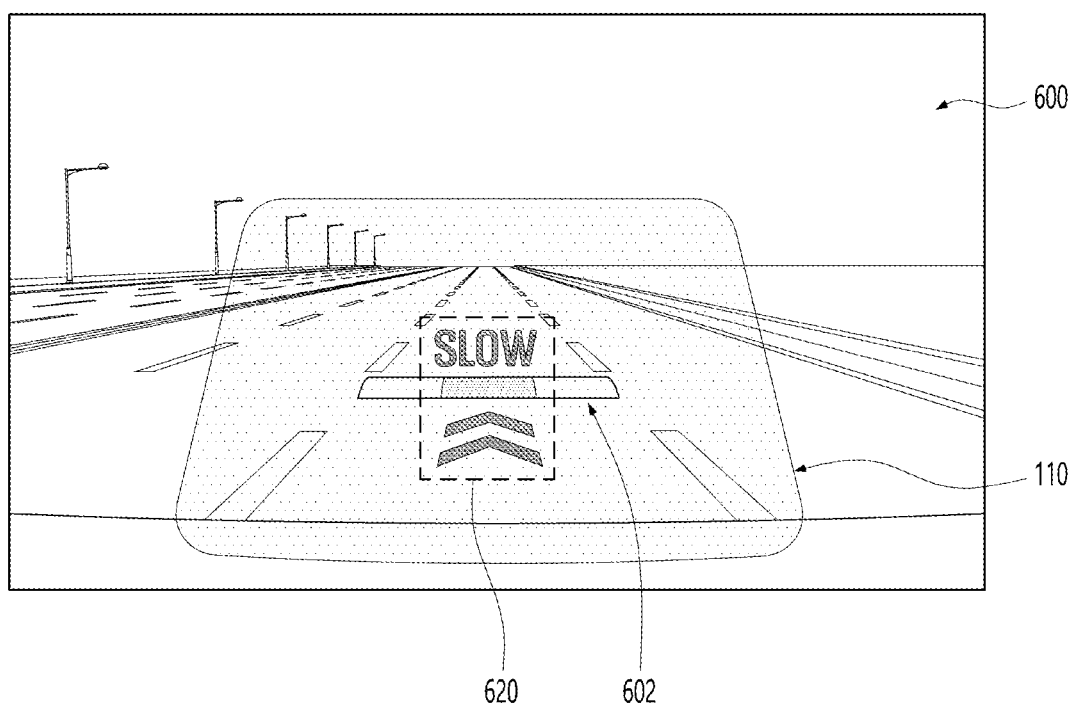

As another example, as shown in FIG. 6D, the sensing unit 120 may sense in a lane where the vehicle 10 runs, or an object 602 (e.g., a speed bump) located at a road. The controller 150 may specify an absolute coordinate of a spot where the object 602 is located, based on sensing information. The controller 150 may specify the absolute coordinate of the object 602, as a preset position where event information 620 related to the object 602 is to be output. Thus, as shown, the event information 620 may be displayed in an overlapped manner with the object 602. Here, in a case where the output state of the event information 620 to the preset position is maintained even while the vehicle 10 is running and the vehicle 10 passes through the preset position, the controller 150 may control the display unit 110 to terminate the output of the event information 620. Thus, a driver may drive while recognizing the object 602, until before the vehicle 10 passes through the preset position.

Figure 6E:
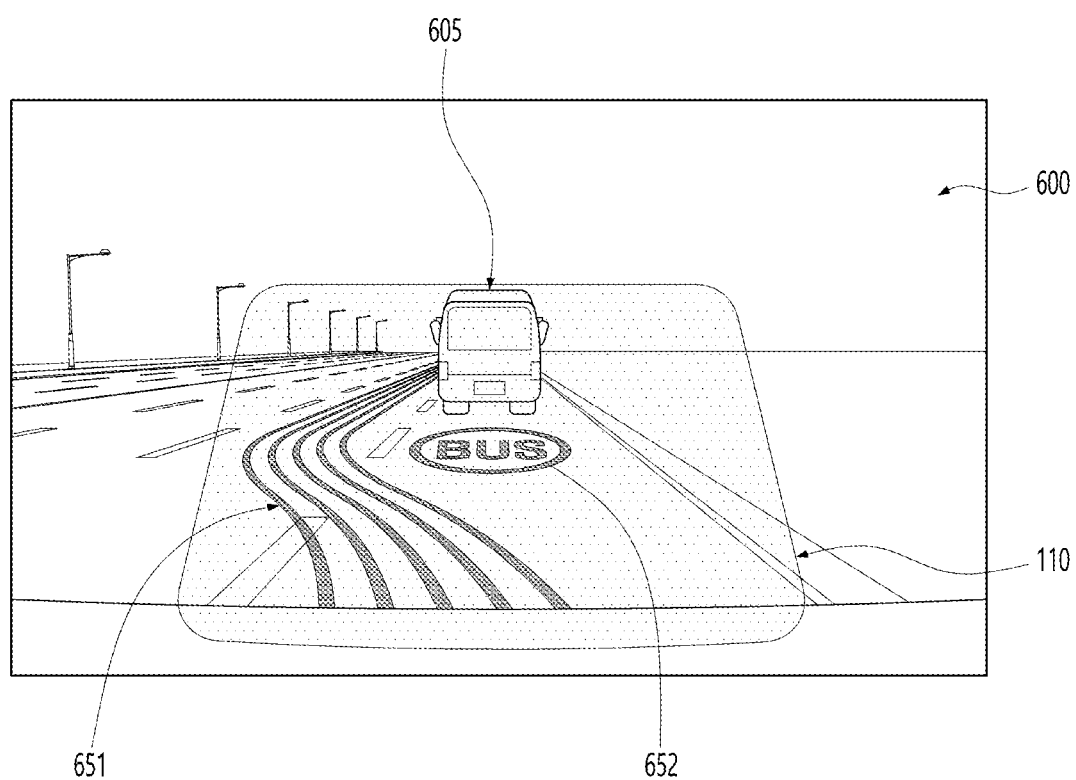

As still another example, as shown in FIG. 6E, the sensing unit 120 may sense a stopped vehicle as an object 605 located in a lane where the vehicle 10 runs. The controller 150 may specify an absolute coordinate of a spot where the object 605 is located, based on sensing information. The controller 150 may specify an absolute coordinate of a region adjacent to the absolute coordinate of the object 605, as a preset position where event information is to be output. In this case, event information may include detour information 651, 652 on the object 605. If it is sensed that the object 605 corresponding to a stopped vehicle is located on a lane where the vehicle 10 runs, the controller 150 may generate detour information for bypassing the object 605 or the corresponding lane, as event information. Then, the controller 150 may output the generated information to the display unit 110.

In a case where the object 605 has disappeared (e.g., the stopped vehicle has moved) before the vehicle 10 passes through a region corresponding to an absolute coordinate specified as the preset position, the controller 150 may terminate the output of the event information. In this case, the controller 150 may terminate the output of the event information, because there is no event due to the object 605 any longer. Further, in a case in which the object 605 has disappeared (e.g., the stopped vehicle has moved) before the event information is output to a corresponding absolute coordinate on the display unit 110, the event information may not be output, even if the corresponding absolute coordinate is within an FOV of the head-up display after the current viewpoint.

Here, in a case where the output state of the event information 651, 652 to the preset position is maintained even while the vehicle 10 is running and the vehicle 10 passes through the preset position, the controller 150 may control the display unit 110 to terminate the output of the event information 651, 652. Thus, a driver may drive while recognizing the object 605, until before the vehicle 10 passes through the preset position.

Figure 6F:
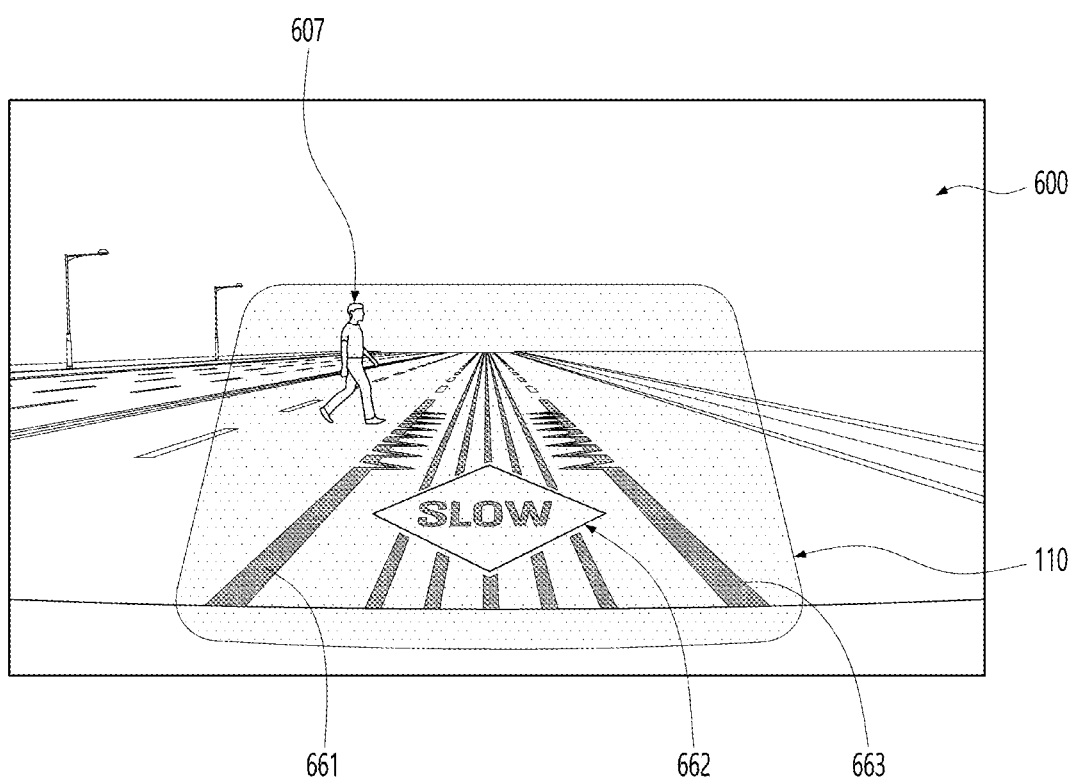

As still another example, as shown in FIG. 6F, the sensing unit 120 may sense a person (i.e., a pedestrian) 607 located near a lane where the vehicle 10 runs. In this case, the sensing unit 120 may sense the pedestrian 607 who moves towards the lane where the vehicle 10 runs, as an object. The controller 150 may specify an absolute coordinate of a spot where the pedestrian 607 is located, based on sensing information. The controller 150 may specify an absolute coordinate of a region adjacent to the absolute coordinate of the spot where the pedestrian 607 is located, as a preset position where event information is to be output. In this case, the preset position may correspond to a position of the lane where the vehicle runs.

As shown in FIG. 6F, event information may include at least one graphic object (or a graphic element) 661, 662, 663. As shown, the controller 150 may locate the graphic objects 661, 662, 663 in a lane adjacent to the pedestrian 607, or in the lane where the vehicle 10 runs. A driver may pay more heed to the pedestrian when driving on the lanes where the graphic objects 661, 662, 663 are located in a displayed state in a width direction.

In the method and system of controlling a head-up display according to the present invention, information related to a safety distance (minimum distance) between cars may be output as the event information.

To the vehicle having the display unit 110, a safety distance from a vehicle ahead may be set. The safety distance may be set as a different standard according to a road where the vehicle runs. As an example, the safety distance may be 30 m on a city street shown in FIG. 7A, and may be 110 m on a highway shown in FIG. 7B.

Figure 7A:
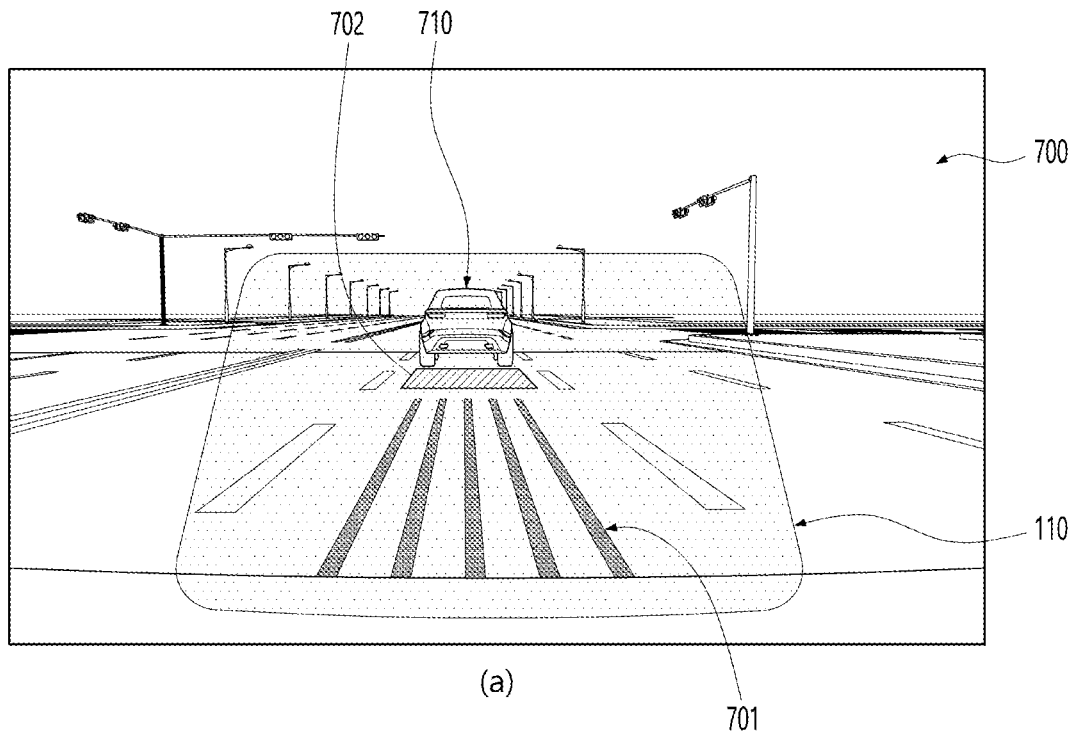
Figure 7A:
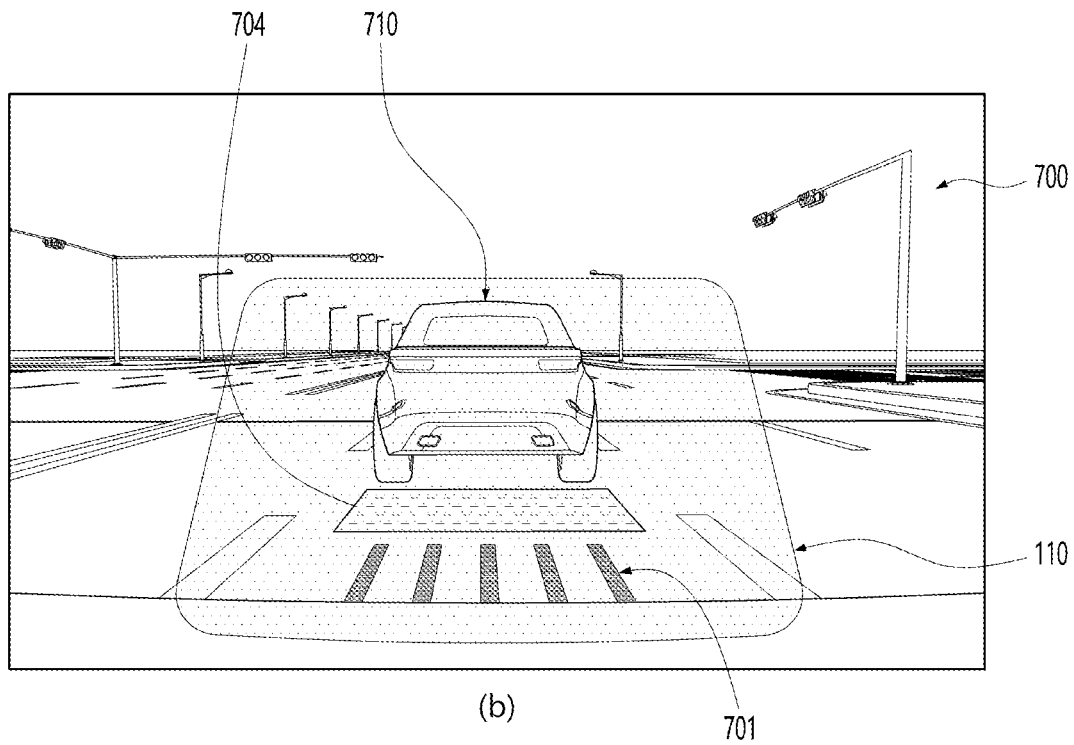

As shown in FIG. 7A(a), if it is sensed that the distance between the vehicle and a vehicle 710 ahead is within a preset safety distance, the controller 150 may sense an event occurrence based on a determination. The controller 150 may determine whether a situation corresponding to an event has occurred in a space 700 where the vehicle 10 runs, based on sensing information sensed by the sensing unit 120.

In this case, the event information may be provided with first information 701 indicating a violated safety distance, and second information 702 indicating the position of the vehicle 710 ahead. The first information 701 may be a plurality of lines outputted between the vehicle and the vehicle 710 ahead, and the second information 702 may be a guide object formed in a width direction of the vehicle with crossing the plurality of lines.

In this case, the event information can be output in a combination manner between an absolute coordinate and a relative coordinate. For instance, referring to FIG. 7A(a), if it is sensed that a distance between the vehicle and the vehicle 710 ahead is within a preset safety distance, the second information 702 is output to the position of the vehicle 710 ahead. In this case, the output of the second information 702 may be maintained at the position of the vehicle 710 ahead, by using a relative distance between the vehicle 710 ahead and the vehicle having the display unit 110. The length of the first information 701 may be changed according to the relative distance.

Then, if the vehicle ahead is stopped, the output of the second information 702 may be fixed at the position of the vehicle 710 ahead. Here, by using an absolute coordinate corresponding to the position of the vehicle 710 ahead, the output of the second information 702 may be maintained at the absolute coordinate. In this case, the output of the second information 702 may be terminated according to a vehicle speed. For instance, when the vehicle is stopped or has a speed less than a preset value, the output may be terminated.

In this embodiment, an output attribute of the second information 702 may be changed in a case in which the vehicle 710 ahead is running, and in a case in which the vehicle 710 ahead is stopped. More specifically, the color of the second information 702 can be changed from one color to another color.

Figure 7B:
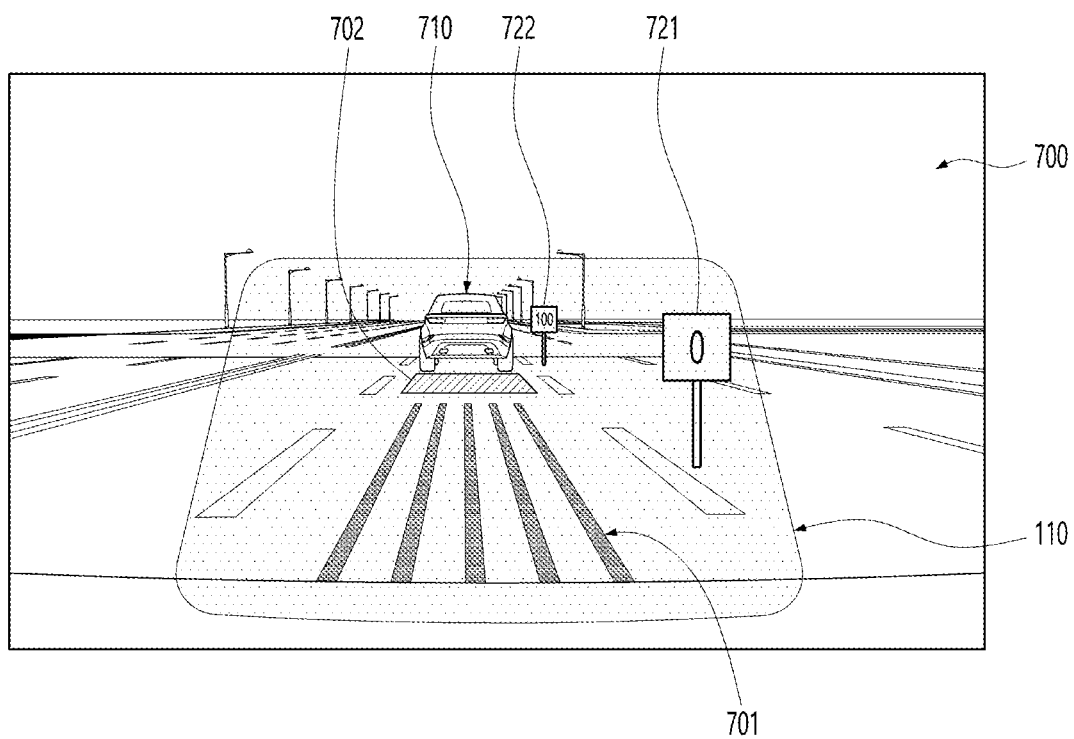

As still another example, referring to FIG. 7B, the event information may be provided with third information 721, 722 indicating a recommended safety distance. As an example, corresponding information may be output to a starting point and an ending point where a driver can recognize the recommended safety distance.

In this case, the starting point and the ending point may be points spaced from each other along a lane, and may be preset positions fixed to absolute coordinates. This may allow a driver to intuitively compare the interval from a vehicle ahead with the recommended safety distance.

More specifically, when the recommended safety distance is 110 m, information 721 corresponding to 0m and information 722 corresponding to 100 m may be output to preset positions of the display unit 110. However, the present invention is not limited to this. When the recommended safety distance is 110 m, information corresponding to 0m and information corresponding to 110 m, i.e., plural information having the same separation distance therebetween as the recommended safety distance may be output.

Figure 7C:
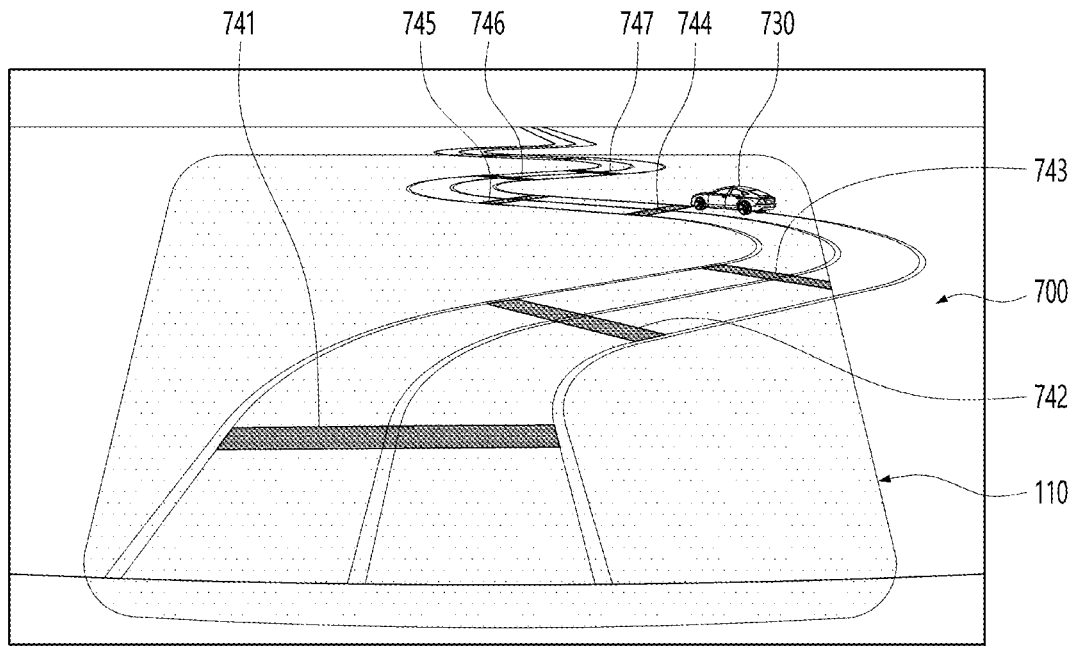
Figure 7C:
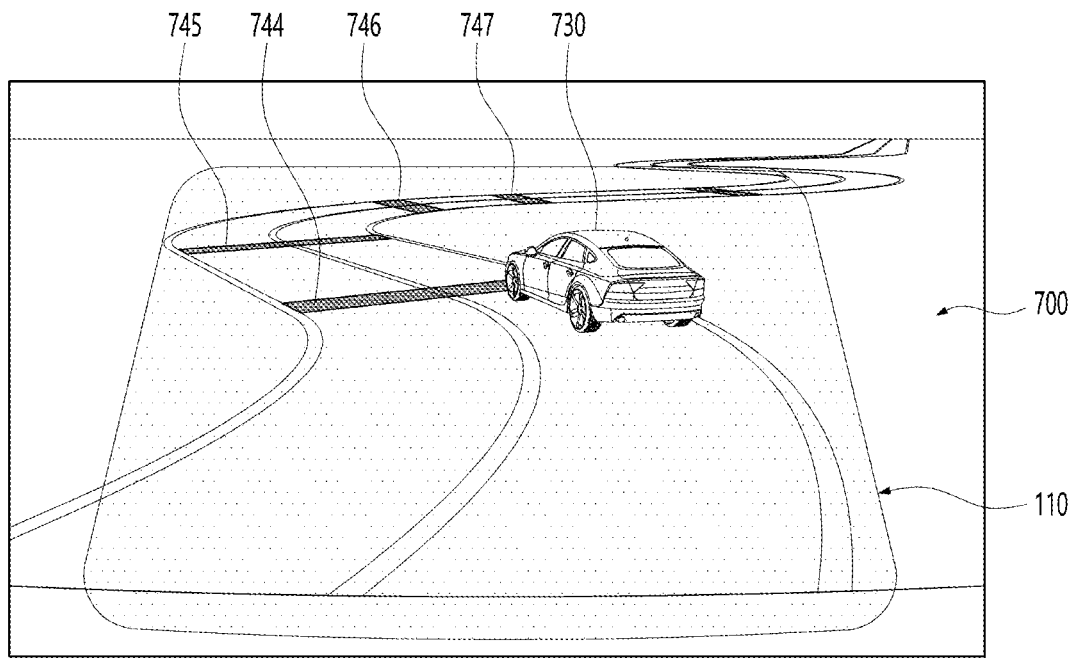

Next, referring to FIG. 7C, fourth information 741, 742, 743, 744, 745, 746, 747 indicating the recommended safety distance may be sequentially arranged at a plurality of points along a driving direction of the vehicle. The fourth information 741, 742, 743, 744, 745, 746, 747 are fixed onto absolute coordinates, and a driver can consecutively recognize the recommended safety distance while driving the vehicle, through the sequential arrangement. In this case, as shown in FIG. 7C(b), the information 741, 742, 743 of spots where the vehicle passes, among the fourth information, have their outputs terminated on the display unit 110 whenever the vehicle passes through the spots.

As still another embodiment, turn-by-turn (TBT) information may be output to a preset path on a navigation in the method and system of controlling a head-up display according to the present invention, as shown in FIGS. 1 and 2. the turn-by-turn (TBT) information is for guiding in the form of a visual indication (an arrow or an image) by real-time reflecting traffic information of the vehicle. For instance, when the TBT point approaches, but the vehicle is not located in a lane capable of TBT on the preset path, the controller 150 may detect that an event has occurred, based on the determination. As another example, when an obstacle such as another vehicle exists on the path of the vehicle, the controller 150 may sense an event occurrence. The controller 150 may determine whether a situation corresponding to an event has occurred in a space 800 where the vehicle 10 runs, based on sensing information sensed by the sensing unit 120.

Figure 8A:
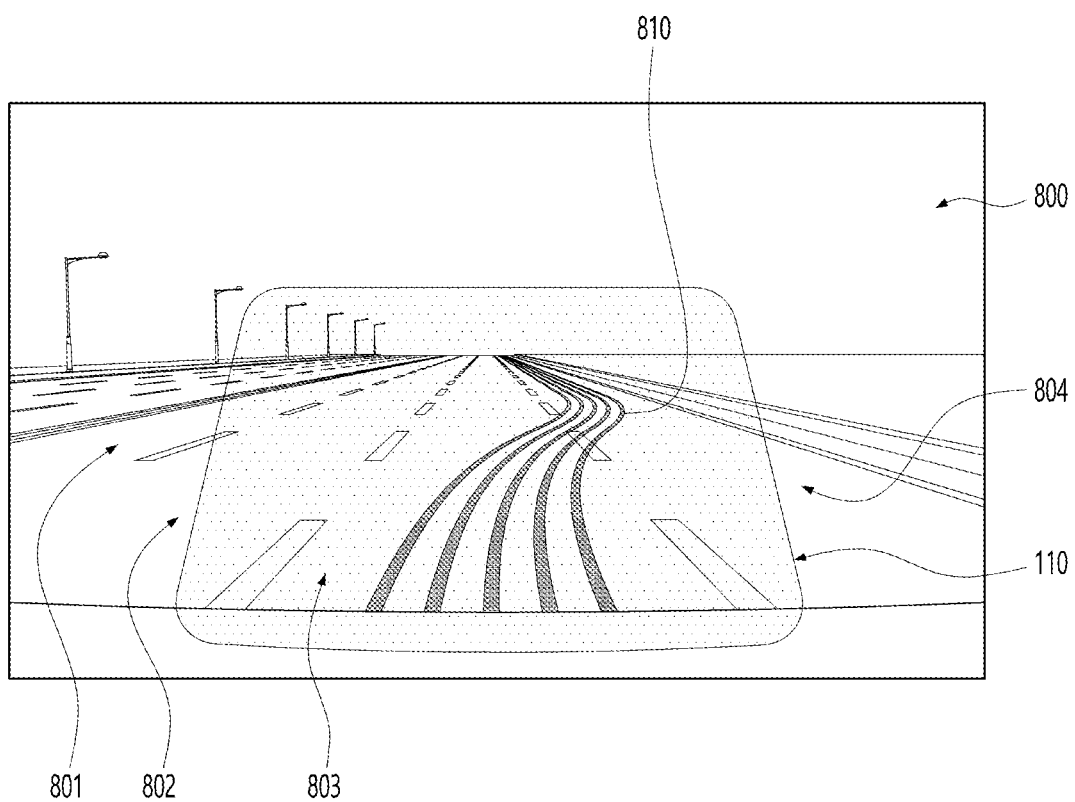

More specifically, referring to FIG. 8A, in a case where the vehicle should turn right 200 m ahead while running on a third lane of a four-lane road, the display unit 110 outputs event information indicating a lane change. The event information may be a plurality of lines 810 indicating a lane changing path of the vehicle, and may be an image connected from a lane 803 where the vehicle is running, to a lane 804 where the vehicle is to run.

Figure 8B:
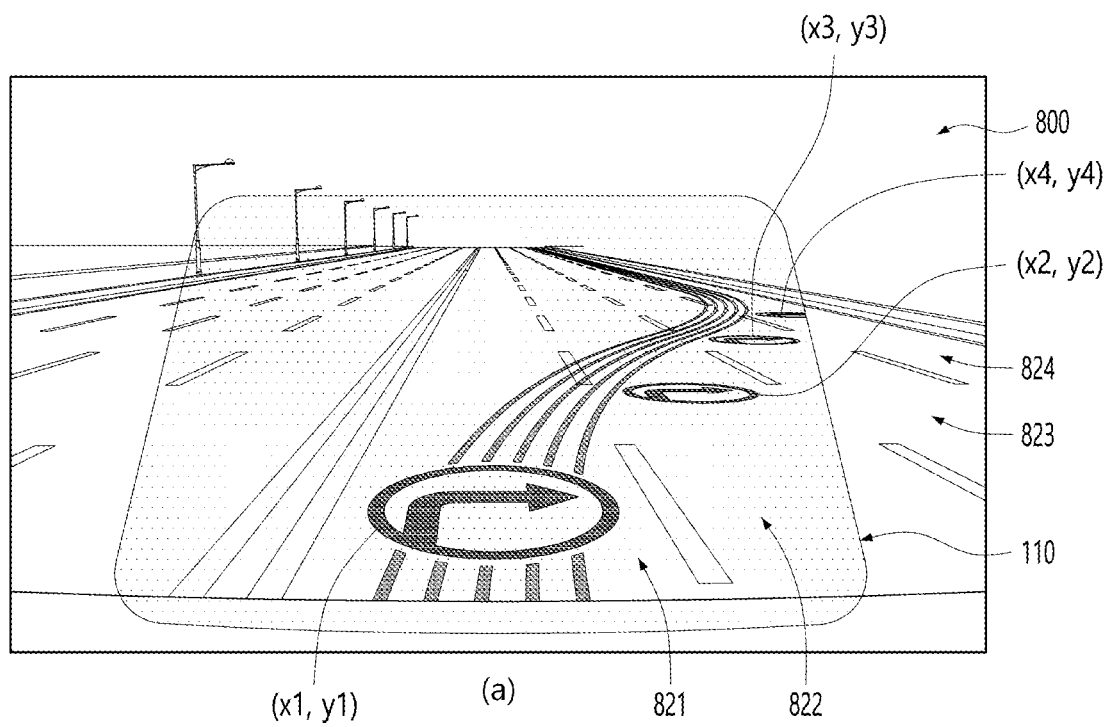
Figure 8B:
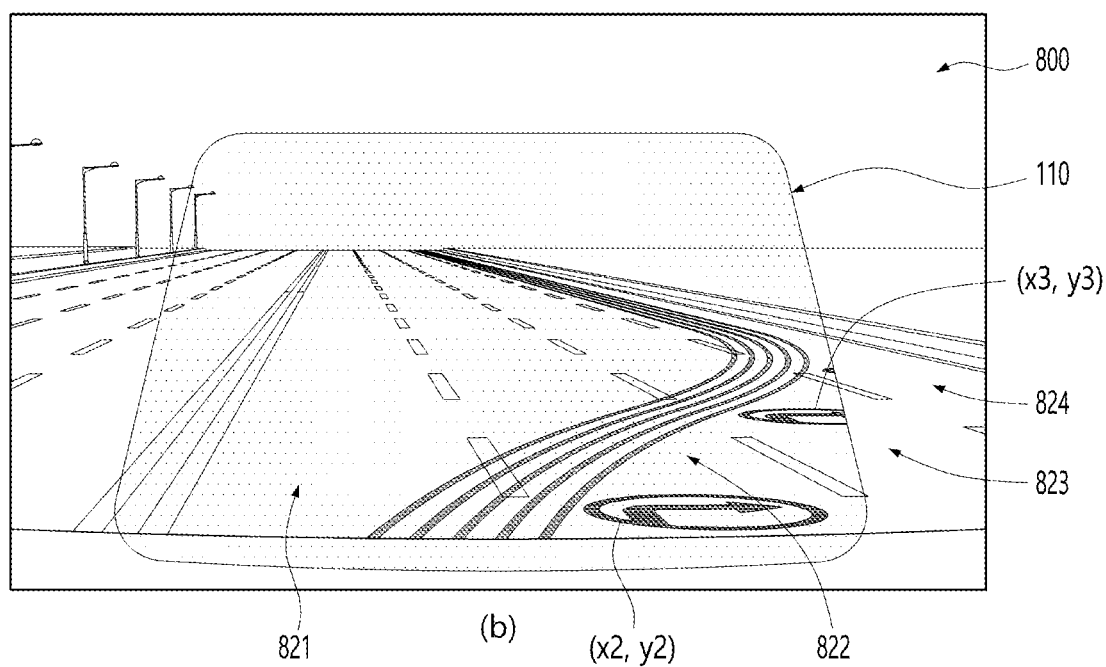

Here, the event information may be fixedly output to a preset position by using an absolute coordinate. Referring to FIG. 8B, graphic objects indicating a lane change may be sequentially output in front of the vehicle at specific intervals. For instance, when it is determined that a lane change is required, arrows may be output to a spot located 10 m in front of the vehicle (x1, y1), a spot located 20 m in front of the vehicle (x2, y2), . . . , a spot located (10N)m in front of the vehicle, and a TBT spot which is the last spot (x4, y4).

In a case where the vehicle is located on a first lane 821 of a four-lane road, the arrows may be output to the respective lanes, and a specific interval therebetween may be set along a front direction of the vehicle.

In this case, each output spot may be a preset position of an absolute coordinate. Since the event information is output to a fixed position, even if the vehicle has not completed a lane change to a fourth lane after having passed through the spot (x1, y1), the arrows may be output to the spot (x2, y2), the spot (x3, y3) and the TBT spot which is the last spot (x4, y4) as shown in FIG. 8B(b).

According to such an output method, a driver may intuitively recognize the degree of deviation of the vehicle from a normal path.

Finally, when the vehicle passes through the TBT spot (x4, y4), the output of the event information to the display unit 110 may be terminated.

As aforementioned, in the method and system of controlling a head-up display according to the present invention, even while a vehicle is running, event information may be output to a specific position related-to an event. More specifically, in the method and system of controlling a head-up display according to the present invention, an output of event information may be maintained on a specific position related to an event which occurs in real time even while a vehicle is running. This may allow a driver to be provided with event information in an interworking manner with a real situation even while driving the vehicle, thereby enabling the driver to immediately handle the real situation with respect to the event.

The aforementioned present invention may be executed by one or more processes in a computer, and may be implemented as a program which can be stored in a computer-readable medium.

Further, the aforementioned present invention can be implemented as a computer-readable code or instruction word in a program-recorded medium. That is, the present invention may be provided in the form of a program.

The computer-readable medium includes all types of recording devices for storing data which can be read by a computer system. Examples of the computer-readable medium include a Hard Disk Drive (HDD), a Solid State Disk (SSD), a Silicon Disk Drive (SDD), ROM, RAM, CD-ROM, a magnetic tape, a floppy disk, an optical data storage device, etc.

Further, the computer-readable medium may be a server or a cloud storage which includes a storage unit and to which an electronic device can access through communications. In this case, the computer may download a program of the present invention from the server or the cloud storage unit, through wired or wireless communications.

Further, in the present invention, the aforementioned computer is an electronic device where a processor, i.e., a Central Processing Unit (CPU) is mounted, and there is no limitation on the type of the computer.

The foregoing embodiments are merely exemplary and are not to be construed as limiting the present invention. The scope of the present invention should be determined by reasonable interpretations of the appended claims, and all changes and modifications that fall within the metes and bounds of the claims, or equivalents of such metes and bounds are therefore intended to be embraced by the appended claims.

The invention claimed is:

1. A method of controlling a head-up display which provides information related to a driving of a vehicle by referring to a pre-existing specific map stored in a storage unit and having at least three layers for providing static information, semi-static information and dynamic information, the method comprising:
   sensing an occurrence of an event related to the vehicle occurring in real space;
   updating the specific map to include event information related to the event on one of the at least three layers in response to the occurrence of the event;
   outputting the event information to a preset position in front of the vehicle by using the head-up display based on the updated specific map;
   maintaining the output of the event information at the preset position, even if a relative distance between the vehicle and the preset position is changed based on the driving of the vehicle; and
   terminating the output of the event information when the vehicle passes through the preset position,
   wherein the event information is deleted from the updated specific map when the vehicle has passed through the preset position.

2. The method of claim 1, wherein the updating of the event information includes:
   specifying a first absolute coordinate corresponding to a current position of the vehicle in response to the event occurrence; and
   specifying the preset position where the event information is to be output based on the first absolute coordinate.

3. The method of claim 2, wherein in the specifying of the preset position, a second absolute coordinate corresponding to a spot spaced from the first absolute coordinate by a predetermined distance along a driving direction of the vehicle is specified as the preset position.

4. The method of claim 3, wherein the updating of the event information further includes mapping the event information to a region corresponding to the second absolute coordinate in the specific map.

5. The method of claim 4, wherein the event information is output to the preset position corresponding to the second absolute coordinate by referring to the specific map.

6. The method of claim 3, wherein in the maintaining of the output of the event information at the preset position, an output attribute of the event information outputted through the head-up display is controlled such that the event information is located at the preset position corresponding to the second absolute coordinate from a viewpoint of a driver of the vehicle.

7. The method of claim 6, wherein the output attribute of the event information is related to at least one of an output position and an output size of the event information on the head-up display.

8. The method of claim 7, wherein as the vehicle moves towards the second absolute coordinate from the first absolute coordinate, an output position of the event information is fixed to the second absolute coordinate, and an output size of the event information is changed.

9. The method of claim 6, wherein the output attribute of the event information is changed such that the event information is located on the preset position as the vehicle moves towards the second absolute coordinate from the first absolute coordinate.

10. The method of claim 3, wherein in the terminating of the output of the event information, the first absolute coordinate corresponding to the current position of the vehicle is collected at preset time intervals, and the collected first absolute coordinate is compared with the second absolute coordinate, thereby determining whether the vehicle has passed through the preset position.

11. The method of claim 1, wherein the specific map is downloaded from a preset server.

12. The method of claim 1, wherein in the sensing of the occurrence of an event, based on reference driving information included in the specific map, a determination is made as to whether the vehicle is running according to the reference driving information.

13. The method of claim 12, wherein the reference driving information includes information on a speed limit of a road where the vehicle is currently running, and
wherein the event occurs when a driving speed of the vehicle exceeds the speed limit as a comparison result between the speed limit and the driving speed of the vehicle.

14. The method of claim 1, wherein the event includes an object positioned on a road where the vehicle runs, and the event information includes detour information on the object.

15. The method of claim 14, wherein in the outputting of the event information, the preset position where the event information is to be output is specified on the basis of an absolute coordinate of a spot where the object is located.

16. The method of claim 1, wherein the specific map is categorized into the at least three layers according to a change attribute of update information, and
wherein the change attribute is defined by a lapse of a time when the information change has occurred.

17. A control system of a head-up display, comprising:
a head-up display configured to provide information related to a driving of a vehicle;
a storage unit configured to store a pre-existing specific map having at least three layers for providing static information, semi-static information and dynamic information; and
a controller configured to update the specific map to include event information related to an event related to the vehicle on one of the at least three layers and output the event information to a preset position in front of the vehicle, by using the head-up display, based on the updated specific map, when an occurrence of the event related to the vehicle is sensed in real space,
wherein the controller maintains the output of the event information at the preset position, even if a relative distance between the vehicle and the preset position is changed based on the driving of the vehicle, and
wherein the controller controls the head-up display such that the output of the event information is terminated when the vehicle passes through the preset position,
wherein the controller deletes the event information from the updated specific map when the vehicle has passed through the preset position.

18. The system of claim 17, wherein the specific map includes coordinate information of an absolute coordinate, and
wherein the controller consecutively outputs the event information to the preset position by using the absolute coordinate.

19. A non-transitory computer-readable recording medium storing a program for controlling a head-up display which provides information related to a driving of a vehicle by referring to a pre-existing specific map stored in a storage unit and having at least three layers for providing static information, semi-static information and dynamic information, the program enabling a processor to execute the steps comprising:
sensing an occurrence of an event related to the vehicle occurring in real space;
updating the specific map to include event information related to the event on one of the at least one of the three layers in response to the occurrence of the event;
outputting the event information to a preset position in front of the vehicle, by using the head-up display based on the updated specific map;
maintaining the output of the event information at the preset position, even if a relative distance between the vehicle and the preset position is changed based on the driving of the vehicle; and
terminating the output of the event information when the vehicle passes through the preset position,
wherein the event information is deleted from the updated specific map when the vehicle has passed through the preset position.

* * * * *